United States Patent
Zhang et al.

(10) Patent No.: US 12,037,474 B2
(45) Date of Patent: Jul. 16, 2024

(54) UNIDIRECTIONAL NANOPORE DEHYDRATION-BASED FUNCTIONAL POLYMER MEMBRANE OR HYDROGEL MEMBRANE, PREPARATION METHOD THEREOF AND DEVICE THEREOF

(71) Applicant: SOOCHOW UNIVERSITY, Suzhou (CN)

(72) Inventors: Yuqing Zhang, Suzhou (CN); Meng Zhang, Suzhou (CN); Xuan Dong, Suzhou (CN); Zhihao Zhong, Suzhou (CN); Hengda Wang, Suzhou (CN); Fengya Jing, Suzhou (CN); Jixin Li, Suzhou (CN); Zhenzhen Wei, Suzhou (CN); Shuxiang Zhao, Suzhou (CN); Yujie Weng, Suzhou (CN); Zhengguo Wei, Suzhou (CN); Haiyan Wang, Suzhou (CN)

(73) Assignee: SOOCHOW UNIVERSITY, Shuzhou (CN)

(*) Notice: Subject to any disclaimer, the term of this patent is extended or adjusted under 35 U.S.C. 154(b) by 0 days.

(21) Appl. No.: 18/200,490

(22) Filed: May 22, 2023

(65) Prior Publication Data
US 2023/0295387 A1    Sep. 21, 2023

Related U.S. Application Data

(63) Continuation of application No. PCT/CN2023/073618, filed on Jan. 28, 2023.

(30) Foreign Application Priority Data

Jan. 29, 2022   (CN) .......................... 202210112449.1

(51) Int. Cl.
C08J 5/18      (2006.01)
C08L 89/00    (2006.01)
C08L 93/00    (2006.01)

(52) U.S. Cl.
CPC ............... *C08J 5/18* (2013.01); *C08L 89/005* (2013.01); *C08L 93/00* (2013.01); *C08J 2389/00* (2013.01); *C08J 2393/00* (2013.01); *C08J 2429/04* (2013.01)

(58) Field of Classification Search
CPC ...... C08J 5/18; C08J 2389/00; C08J 2393/00; C08J 2429/04; C08L 39/005; C08L 93/00
See application file for complete search history.

(56) References Cited

FOREIGN PATENT DOCUMENTS

| CN | 101028536 A | 9/2007 |
|---|---|---|
| CN | 102847194 A | 1/2013 |
| CN | 109793928 A | 5/2019 |
| CN | 112401157 A | 2/2021 |
| CN | 114702704 A | 7/2022 |

OTHER PUBLICATIONS

CN 112401157 machine translation (Year: 2021).*

* cited by examiner

*Primary Examiner* — Edward J Cain

(57) ABSTRACT

An unidirectional nanopore dehydration-based functional polymer membrane or hydrogel membrane, preparation method thereof and device thereof. Adding an aqueous polymer solution or a polymer mixture solution into a mold through a sampling hole on the top of a container with a nanoporous filter film as the bottom, after closing said sampling hole, the water molecules in the solution are dehydrated in one direction downward through the nanopores of the filter film, and obtain said polymer membrane or hydrogel membrane on the upper surface of the nanoporous filter film; it can also undergo in situ polymerization with pyrrole in an aqueous solution to obtain a conductive PM or PHM modified by polypyrrole. The invention adopts a UND-based mold, and green processing obtains a novel polymer material with an ordered molecular arrangement, which has the characteristics of flexibility, transparency, and robust mechanical properties. The polymeric material has broad applications.

4 Claims, 9 Drawing Sheets

UNIDIRECTIONAL NANOPORE DEHYDRATION-BASED FUNCTIONAL POLYMER MEMBRANE OR HYDROGEL MEMBRANE, PREPARATION METHOD THEREOF AND DEVICE THEREOF

This application is a Continuation Application of PCT/CN2023/073618, filed on Jan. 28, 2023, which claims priority to Chinese Patent Application No. 202210112449.1, filed on Jan. 29, 2022, which is incorporated by reference for all purposes as if fully set forth herein.

FIELD OF THE INVENTION

The present invention relates to the preparation of polymer membranes (PM), polymer hydrogel membranes (PHM), polymer composite/cross-linked membranes, PM or PHM for the immobilization of enzymes, polypeptides, drugs, active factors, pigments, or microorganisms. In particular, the invention relates to the preparation of a PM or PHM with excellent mechanical strength, good biocompatibility, and flexibility, and a multifunctional composite/cross-linked membrane thereof, which may be considered a biological material or a biomimetic material, and is suitable for wearable devices, drug sustained release and delivery, microbial immobilization, separation film, and medical tissue engineering materials.

BACKGROUND OF THE INVENTION

At present, in dehydration processes using semi-permeable membranes, microporous membranes, or hollow fiber membranes, the water molecules are driven through the micropores by a pressure or osmotic pressure difference to achieve the purpose of aqueous solution concentration or two-phase separation. Aqueous polymer solutions are generally dehydrated and dried by spray drying technology that produces powder or granules, while biologically active substances that are sensitive to the environment, such as microorganisms, proteases, peptide drugs, and active factors, can be made by lyophilization technology or low-temperature spray drying. The resulting powders or granules are isotropic, and there are no significant differences in their structure and physical and chemical properties.

Silk is a protein-based natural polymer fiber produced by *Bombyx mori*, composed of silk fibroin and sericin which acts as an adhesive for the former. For decades, the extended applications of silk protein, especially silk fibroin, have been of great interest, mainly because of its unique molecular structure, physicochemical properties, and excellent biocompatibility. The degummed silk fiber, from which the sericin has been removed, can be dissolved into salt solutions, such as the high concentration neutral salts lithium bromide or calcium chloride, and an aqueous solution of regenerated silk fibroin can be obtained from the salt solution after dialysis against water. After processing, water-soluble silk fibroin solution (SFS) can be widely used in biological materials for various applications.

The molecular weight of the silk fibroin can be as high as 410 kDa because of a single disulfide bond between the light chain (27.5 kDa) and the heavy chain (about 390 kDa), which are present in a 1:1 molar ratio. It is now generally believed that silk fibroin is a fibrous protein with an amorphous and bimorphic structure, and the molecular chain is composed of random-coil, α-helix, type II β-turn, and anti-parallel β-sheet structures. The crystal structures of silk I and silk II previously described are now mostly considered to be the latter two. The regenerated silk fibroin can be easily converted from its random coil and Silk I structures to the more stable Silk II structure by physical or chemical treatment. Regenerated silk fibroin can be processed into various forms of stable silk biomaterials, including hydrogel and powder, by physical methods, such as shearing, foaming and ultrasonic waves. Regenerated silk fibroin can also be made into silk biomaterials including film, glue and hydrogel with different crystal structures by electrodeposition, laser radiation, plasma and electric fields.

The most common preparation method of film-like silk fibroin is to spread the regenerated liquid silk solution on a polypropylene plate for evaporation and dehydration. Most silk fibroin membranes (SFMs) formed at or below room temperature are soluble in water, so it is often referred to as cast or evaporated silk fibroin membrane (SFM-E). When the SFM-E is subjected to physical or chemical treatment, for example, immersion in an organic solvent, such as methanol, for a moment, the water-soluble SFM-E with random coil and silk I is converted into an anti-parallel β-sheet (Silk II) structured silk fibroin membrane (SFM-EM). After the stretching treatment, the transparent membrane is transformed into a milky-white, wrinkled SFM, which is brittle when dry and slightly elastic when wet. This SFM has poorer mechanical properties and is greatly limited in practical application. When these membranes are exposed to low-temperature water vapor treatment under reduced pressure, often referred to as "annealing", water-insoluble SFMs with increased Silk I structure content and good mechanical properties can be produced (Hu et al. Biomacromolecules 2011, 12:1686-1696). Temperature and humidity will affect the SFM structure during cast film formation. When the film is slowly dried below 9° C., it can become a water-soluble amorphous SFM, and at 20-26° C., it evaporates to form a water-insoluble SFM containing Silk I structure. When evaporated above 40° C., it can form a water-insoluble SFM with a Silk II structure (Kawahara et al. Macromol Mater Eng 2006, 291: 458462). Freeze-thawing, deep-freeze-light freezing, or directional freezing can directly convert liquid silk fibroin into water-insoluble, porous solid-silk fibroin with increased Silk I structure. Water-insoluble SFMs with increased Silk I structure can also be made by making small holes in the lid of the box containing the SFS to allow the water to evaporate slowly (for up to 6 days or more) (Acta Biomaterialia 2010, 6: 1380-1387).

The single-component SFM prepared by the prior art has many shortcomings, such as poor mechanical properties, optical properties, elasticity, toughness, and water absorption. The above slow-drying method takes a long time to prepare the water-insoluble SFM, its drying speed is not easy to control, and the tensile strength is significantly reduced to 1.4±0.1 MPa, which is 45% and 36% of the SFMs prepared by the methanol-annealing method (SFM-EM) and the water vapor annealing treatment, respectively. Therefore, the stability and operability of the high-performance SFMs with increased Silk I structure prepared by the available technology and method still needs improvement.

Polyvinyl alcohol (PVA) is a water-soluble polymer that can dissolve or swell to form an aqueous solution or a dispersion system. The molecular structure of PVA contains many hydrophilic groups, that is, hydroxyl groups. PVA is easily made into a hydrogel, which is chemically inactive, non-toxic, biodegradable, has good biocompatibility, good mechanical properties, high water absorption, and is widely used in agriculture, forestry, medicine, daily chemical, environmental protection, biological materials, and especially medical tissue engineering materials. The linear polymers of PVA and the many hydroxyl groups in the side chain yield the above excellent properties. However, there are also disadvantages, including rapid swelling or even dissolution in water and poor mechanical strength of the hydrogel film, which cannot meet the requirements of practical applications. Therefore, it is necessary to modify the PVA hydrogel film to improve its mechanical and water resistance properties, as well as to broaden its flame retardancy, antibacterial, optical, and electrical properties.

PVA film is usually modified by physical treatment and chemical cross-linking. The former refers mainly to blending with other organic or inorganic substances, nanocomposites, or heat treatment. These methods have simple operational steps and can easily expand the functionality of PVA hydrogel films. The latter modification method mainly refers to the use of cross-linking or grafting to form chemical bonds between the internal polymeric chains before and after PVA film formation to form a cross-linked network, which has the effect of significantly improving the mechanical properties, thermal stability, and water resistance of the PVA hydrogel membranes (PVAHM).

Among these modification methods, heat treatment is a relatively simple method to adjust the internal crystallinity of PVA film and improve its performance. The mechanical properties, thermal stability, water holding, and water resistance are greatly improved by heat treatment. Among the modification methods, the freeze-thawing method is the most common and typical method used to promote the formation of hydrogen bonds and increase crystallinity in order to improve the properties of PVA materials. Generally, freezing at −20° C. or below makes the polymer chain restrict to form crystal nuclei, thawing at 25° C. initiates crystal growth, and increasing the number of freeze-thawing cycles improves the crystal structure and the degree of crystallization. The crystallites formed during freeze-thawing cycles can also act as physical cross-linking points to cross-link the PVA polymer chains. Generally speaking, the more freeze-thawing cycles and the slower the thawing speed of the PVA solution, the larger the crystal growth, the higher the crystallinity, and the better the mechanical properties of the PVA hydrogel film. However, this process also leads to an increase in the tensile strength and elastic modulus of the PVAHM and a decrease in elongation at break (Fukumori et al., J Appl Polym Sci 2014, 131(15), 40578).

In summary, the available PVA hydrogels prepared by physical methods, especially the freeze-thawing cycle method, have poor mechanical properties and cannot withstand the load imposed by the human body, making them unsuitable for severe conditions of use. In addition, although some progress has been made in the mechanical properties of the available technology, the possible applications are relatively simple and lack biological applications. These constraints limit the applications of PVA hydrogels in the field of medical tissue engineering. Therefore, there is an urgent need to develop a hydrogel film with good bonding, high strength, good biocompatibility, and the capability to immobilize active substances under physiological conditions, which can be used in tissue and wound healing, wound dressings, artificial muscles, and even biomedical applications such as microbial immobilization, repair, and regeneration of biological bone tissue, including cartilage.

SUMMARY OF THE INVENTION

The polymer membranes (PM), polymer hydrogel membranes (PHM), and multifunctional bio-composite materials processed by the prior art are deficient in green processing, operational controllability, functionality, and mechanical properties. The present invention adopts an unidirectional nanopore dehydration (UND) technology to make the water molecules in the aqueous polymer solution pass through the nanopores of the filter membrane for unidirectional dehydration so that the polymer molecules are arranged in an orderly manner to form flexible, transparent and high mechanical strength PM/PHMs and their multifunctional biocomposites and conductive material. The present invention also shows a preparation method thereof.

The technical scheme of the present invention provides a preparation method of an unidirectional nanopore dehydration-based functional polymer membrane or hydrogel membrane, adding an aqueous polymer solution or a polymer mixture solution into a mold through a sampling hole on the top of a container, said mold is a container with a nanoporous filter film at the bottom, and said sampling hole is closed with a sealing cover; the water molecules in the solution are dehydrated in one direction downward through the nanopores of the filter film, and said polymer membrane or hydrogel membrane is obtained on the upper surface of the nanoporous filter film.

The technical scheme of the present invention includes the unidirectional nanopore dehydration-based functional polymer membrane or hydrogel membrane obtained by the above preparation method.

The technical scheme of the present invention provides a preparation method of an unidirectional nanopore dehydration-based conductive polymer membrane or hydrogel membrane, adding an aqueous polymer solution or a polymer mixture solution into a mold through a sampling hole on the top of a container, said mold is a container with a nanoporous filter film at the bottom, and said sampling hole is closed with a sealing cover; the water molecules in the solution are dehydrated in one direction downward through the nanopores of the filter film, and a polymer membrane or hydrogel membrane is obtained on the upper surface of the nanoporous filter film, reacting the polymer membrane or hydrogel membrane with pyrrole in aqueous solution for in situ polymerization to obtain a polypyrrole-modified conductive polymer membrane or hydrogel membrane.

The technical scheme of the present invention includes the unidirectional nanopore dehydration-based conductive polymer membrane or hydrogel membrane obtained by the above preparation method.

The aqueous polymer solution described in the present invention includes natural polymers, artificial synthetic polymers in aqueous solution, or a mixture of aqueous solution and polymers of more than 50 kDa formed by physical mixing or chemical cross-linking; by mass percentage, the concentration of the polymer is 1%-20%; the mixture includes proteins, polysaccharides, enzymes, cross-linking agents, plasticizers, drugs, pigments, growth factors, and microorganisms; the concentration of the mixture by mass percentage is 0.1%-20%.

The natural polymer comprises casein, the regenerated liquid silk fibroin of silkworm silk, spider silk, tussah silk, castor silk, or wild silk; the artificial synthetic polymer includes polyvinyl alcohol.

The technical scheme of the present invention provides a device for preparing an unidirectional nanopore dehydration-based functional polymer membrane or hydrogel membrane, said device comprises a container with a nanopore filter membrane as the bottom, and there is a sampling hole and a matching sealing lip on the top of said container, said nanopore filter membrane is a dialysis membrane with a molecular weight cut-off of 0.1-1000 kDa, or a synthetic polymer film with the pore size less or equal to 50 nm.

The device for preparing an unidirectional nanopore dehydration-based functional polymer membrane or hydrogel membrane in the present invention, comprising a molded frame for installing the device, and a highly water-absorbent material or a one-way dehydration accelerator arranged under the nanoporous filter membrane at the bottom of the container; said one-way dehydration accelerator comprises one of a device that generates flowing air, a constant-temperature and -humidity chamber, and a negative pressure or osmotic pressure difference cavity.

In the device for preparing an unidirectional nanopore dehydration-based functional polymer membrane or hydrogel membrane in the present invention, said nanopore filter membrane comprises a regenerated fibrous dialysis film, a flat dialysis cellophane film, ceramic film, polyacrylamide hydrogel film, or a nylon film.

Compared with the prior technology, the beneficial effects of the present invention are as follows:
1. The water-insoluble ultra-thick SFM rich in type II β-turn structure (Silk I) provided by the present invention has a wet tensile strength of 14.6±0.6 MPa, a maximum elongation at break of 640%±55%, and a swelling ratio of about 55%. The wet tensile strength of the polyvinyl alcohol hydrogel film prepared using UND is 3.0-10.5 MPa, the elongation at break is 342%-891%, and the swelling rate is 300%-335%.
2. Before UND, the aqueous polymer solution can be blended or biologically linked with other water-soluble polymers, cross-linking agents, plasticizers, enzymes, drugs, pigments, active factors, and even microorganisms to prepare products with excellent mechanical properties. Bioactive or conductive polymer composite membrane/composite hydrogel membrane. Escherichia coli immobilized with PVAHM has been cultured repeatedly (medium exchange two times each day), and the bacteria proliferated stably and continuously without detaching, and the proliferation efficiency remained above 90%. The mouse fibroblast L929 can also grow and proliferate well on these UND-based polymer materials.
3. The new polymer material based on UND provided by the present invention can be widely used in medical or biological materials, 3D scaffolds, bionic materials, enzyme or drug delivery and sustained release, wearable electronic equipment, bioreactors, microbial fuel cells, engineering bacteria reactors, membrane separation materials, and other fields.

DETAILED DESCRIPTION OF THE INVENTION

The technical scheme of the present invention will be further illustrated through the drawings and following examples.

Example 1

The present example describes the preparation of the sample solutions required in each example according to the technical scheme of the present invention.
(1) Regenerated SFS Cocoon shells of the *Bombyx mori* silkworm are soaked in 70° C. water overnight. The next day, at a cocoon:water ratio of 1:40 (W/V), the swollen cocoon shells are boiled for 2 hours to remove most of the sericin from the outer layer of the silk fibers. Then, the boiled fiber is transferred to a 0.2% (w/v) neutral soap solution, boiled, and degummed for 0.5 hours. The degummed silk fibroin fibers are thoroughly rinsed with distilled water, dried in an oven at 80° C. for 4-5 hours, and finally placed in a room overnight to equilibrate, producing silk fibroin fibers. The degummed fibers at 1:25 (W/V) fiber:bath ratio are dissolved in $CaCl_2$)-ethanol-$H_2O$ (1:2:7, mol) ternary solution at 65° C. for 3 hours with shaking to become silk fibroin calcium salt solution. Then, a dialysis tube with a molecular weight cut-off of 8-14 kDa is used for dialysis against pure water for 72 hours to remove the salt ions. Finally, impurities and a small amount of protein aggregates are removed by centrifugation to obtain an aqueous solution of regenerated silk fibroin (SFS) with a concentration of ~3.0% (W/V).
(2) PVA in Aqueous Solution PVA powder (CAS: 9002-89-5; Mowiol® PVA-124, viscosity: 54-66 mPa'S) is purchased from Shanghai Aladdin Company, China. The PVA powder is suspended in water, placed on an electric furnace at 90° C., heat-treated in a high-temperature and high-pressure box at 120° C. for 2 hours, and finally prepared into a 10 w % PVA in aqueous solution for later use.

Example 2

Figure 1:
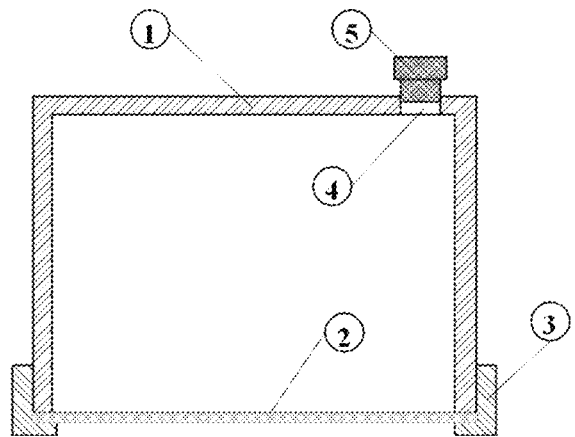
FIG. 1 is a structural representation of the UND mold provided by the present invention: 1. film-forming cup body; 2. nanopore filter membrane; 3. fixing ring; 4. sampling hole; 5. sampling hole stopper.

The present example provides the preparation method of the PM/PHM described in the technical scheme of the present invention.
(1) Preparation of PM or PHM Using UND
FIG. 1 is a schematic structural diagram of a UND mold for the preparation of PM/PHM provided in the present example; the processing mold is composed of a film-forming cup body (1) with an inner cavity diameter of 30 mm or 80 mm, nanoporous filter film (2), fixing ring (3), sampling hole (4), and sampling hole rubber stopper (5). The circular nanoporous filter film (2), which has been moistened in water, is fixed by the inner screw of the fixing ring (3), placed on the horizontal mold shelf, and a small amount of distilled water is added through the sampling hole (4) with a pipette to test whether the fixed filter film (2) is water-tight. If the film leaks water, the above steps are repeated until no water leaks.

A pipette is used to add a certain volume and concentration of aqueous polymer solution, or a mixture in aqueous solution with other compounds into the film-forming cup (1) of the mold through the sampling hole (4) and the sampling hole (4) is blocked with a sealing stopper (5) after the sample has been added. Then, the entire mold is placed under certain environmental conditions of temperature and humidity so that the polymer solution in the mold is dehydrated unidirectionally and dried through the nanopores of the filter membrane, and a piece of PM or PHM and its composites with an area of 7.0 or 50.0 cm$^2$ are formed after several hours or more than ten hours, respectively.
(2) Methods to Accelerate UND
According to the mold shown in FIG. 1 and the UND method adopted above in the present example, a dialysis membrane with a cut-off molecular weight of 0.1 to 10 kDa is installed in the bottom of the mold. Using the sampling hole (4) at the top of the mold, 5 or 35 mL of regenerated liquid silk fibroin in aqueous solution (SFS) with a concentration of 3.0% by mass is added to the mold, the sampling hole (4) is blocked with a rubber stopper (5) after adding the silk solution, and the mold is placed horizontally on a mold rack. At room temperature (25° C.) or relative humidity (50% RH), a fan is added under the mold to increase air flow, and then unidirectional dehydration via nanopores occurs for 10 to 16 hours, and the aqueous solution in the mold dries into an SFM on the nanoporous filter film of the mold, which is a PM or PHM.
(3) Preparation of Experimental Control Samples: Cast Film or Cast Hydrogel Film
A traditional cast method spreads the aqueous polymer solution of a certain volume and concentration on a horizontal polypropylene (PP) plate. The PM is formed by water evaporation and drying at room temperature or constant temperature and humidity (25° C. and 50% RH). The polymer film (an evaporated or cast PM or PHM) is mainly used as an experimental control.

In this example, when the control sample is silk fibroin, the water-soluble silk fibroin membrane (SFM-E) is formed from the PP plate by water evaporation. After immersion in 80% methanol in aqueous solution for 1-2 minutes, a water-insoluble SFM rich in β-sheet structure (SFM-EM) forms. The water-soluble SFM-E and water-insoluble SFM-EM are used as experimental control samples.

Example 3

The present example provides methods for testing the mechanical, structural, and in vitro properties of the materials provided by the various examples of the technical schemes of the present invention.
(1) Mechanical Properties
After the aqueous polymer solution is dehydrated unidirectionally through a nanoporous filter to form a membrane or hydrogel membrane, it is cut into a rectangular strip of a certain size immediately after removing it from the mold. Before the tensile properties are measured, the samples are immersed in 25° C. water for 24 hours. Tensile properties are tested with an electronic tensile testing machine (WH-5000, NingBo Wei-Heng Testing Instrument Co., Ltd. P. R. China). During the measurement, the room temperature is maintained at about 25° C., and during stretching, the effective spacing is 10 mm. When the stress-strain curve begins to drop sharply, the experiment is stopped, and the data is recorded, from which the mean and standard deviation are calculated.
(2) Swelling Rate
To determine the swelling rate, the PM or PHM sample is cut into rectangular strips (3.0×20.0 mm), placed in a drying oven, dried at 37° C. overnight, and weighed ($M_0$). Next, the dried sample film is immersed in water in a test tube and placed in a 37° C. biochemical incubator to absorb water and swell. Every hour, the sample film is removed from the incubator, the surface water is wiped off with filter paper. Then, the sample is weighed and recorded as $M_n$. The swelling rate of the sample is obtained according to the following formula; five samples are measured, and the mean and standard deviation (±SD) are calculated from this data.

$$\text{Swelling rate (\%)} = (M_n - M_0)/M_0 \times 100\%$$

(3) Structure Analysis
Powdered samples of the PM or PHM (~5.0 mg) are weighed and analyzed by TG, DTG, and DSC with a thermogravimetric/differential thermal analyzer (SDT2960, TA, USA). The protective gas is nitrogen at a flow rate of 100 mL/minute, the temperature range is 25-800° C., and the heating rate is 10° C./minute. A Fourier transform infrared (FTIR) spectrometer (Nicolet 6700, Thermo Fisher, USA) is used to detect the structural features of the PM or PHM powder samples. A mixture of 100 mg of KBr crystals and 1 mg of the sample powder is ground together and pressed into flakes for testing. The number of scans is 16, the resolution is 4 cm$^{-1}$, and the spectral range is 4000-1000 cm$^{-1}$. The spectra of the film samples are directly measured by attenuated total reflection (ATR) FTIR spectroscopy. The powder samples are analyzed with an X'Pert-Pro MPD (PANalytical, Netherlands) with a Cu target, tube pressure of 40 kV, tube flow of 50 mA, λ=1.5406 nm, and the range of diffraction angle (2θ) is 5-50°, the scanning step is 0.02°/sec, and the scanning speed is 2°/minute.
(4) Scanning Electron Microscope (SEM) Observations
First, the PM or PHM that has reached the swelling equilibrium is placed in water and then frozen at −197° C. in liquid nitrogen for several minutes. After removing it, the surface of the sample is fractured with tweezers, and then the sample is placed in a lyophilizer for freeze-drying. Next, the thin sample is fixed on the stage. The surface is sprayed with gold for 70 seconds, and the surface and cross-section or fracture surface morphology of the film samples are observed using a Hitachi S-4700 cold field emission scanning electron microscope (Regulus 8230, Hitachi Co. Ltd, Japan) with an acceleration voltage of 15 kV.

(5) Enzymatic Degradation In Vitro

A certain active unit of protease in aqueous solution is prepared with sterile phosphate-buffered saline (PBS), and the enzyme solution must first be filtered and sterilized. The dry PMs, PHMs or other experimental samples are weighed, recorded as M0, and immersed in a certain volume of protease solution. Three samples are used for each group, and these sample enzyme solutions are placed in an incubator at 25, 37, or 50° C. with shaking (110 rpm) to facilitate enzymolysis. The degradation is observed, and the enzyme solution is renewed daily. After incubation, a group of membrane samples is washed with PBS, dried, weighed, and their masses recorded as $M_n$. Finally, the mean values and standard error (±SD) of the residual rate (%) of enzymatic hydrolysis are calculated according to the following formula.

Residual rate (%)=$M_n/M_0$×100%

(6) Biocompatibility Test

In this experiment, mouse fibroblast L929 is selected as the test cell to observe the cell morphology, growth, proliferation, and growth on PM or PHM samples and evaluate the cellularity and biocompatibility of these samples. The biological medium in this experiment is DMEM high-glucose medium containing 10% fetal bovine serum and 1% penicillin-streptomycin. All operations during cell culture are performed on a clean bench. The environment of the cell incubator is set at a constant temperature of 37° C. and a carbon dioxide concentration of 5%.

The samples are first stored in an aqueous solution at 25° C. for 1 hour and then cut into circular samples. Each sample is separated into 20 pieces and placed in 96-well plates. After the plate is covered, it is sterilized under 365 nm UV light for 5 minutes and washed three times with sterile PBS. L929 cells in the logarithmic growth phase are selected, 1.0 mL of cell suspension is inoculated with a density of 10,000/mL into 96-well plates, and the viability of the L929 cells on the PM or PHM every 24 hours are measured using a cell counting kit (Cell Counting Kit-8, CCK-8). Next, 10 µL of CCK-8 solution is added to the 96-well plate and culturing continues at 37° C. for 4 hours. To avoid the influence of PM or PHM samples on the absorbance, the cell culture solution to be tested is transferred to a new 96-well and placed in a microplate reader to measure the absorbance value of the cell culture solution at 450 nm, with 20 parallels in each group.

Example 4

The present example describes an SFM with excellent mechanical properties prepared using UND.

(1) SFM Preparation

According to the mold shown in FIG. 1 and the UND method provided in Example 1 and Example 2, a dialysis membrane with a molecular weight cut-off of ~10 kDa is selected to be installed in the bottom of the mold. The sampling hole is used to add 5 mL of 3.0% regenerated SFS through the sampling hole at the top of the mold. Then, the sampling hole is plugged with a stopper, and the mold is placed horizontally on a mold rack at a constant room temperature (25° C.) or relative humidity (35% RH) environment. After UND for 10 to 16 hours, the SFS in the mold dries into a sheet on the nanoporous filter membrane and can be removed from the mold after brief immersion in water. A UND-based SFM with excellent mechanical properties is obtained.

(2) Mechanical Properties of SFMs with Different Thicknesses

Five SFMs with a diameter of 30 mm and different thicknesses are prepared using UND with 5.0, 7.0, 10.0, 15.0, and 18.0 mL SFS (3%). The thicknesses vary from 0.205 mm to 1.028 mm: the thickness of the SFM increases with the increasing SFS volume or weight. Table 1 shows that all the SFMs from 5 to 18 mL of SFS (3%) are formed on the same area (7 cm$^2$). However, the tensile strength analysis shows that an increased volume of silk fibroin leads to thicker films. The UND time to form SFM is prolonged, and its tensile strength and elongation at break decrease significantly. From Table 1, the SFM formed within 1 day has the highest mechanical properties of 11.8 MPa, and an elongation at break of up to 490%.

TABLE 1

Effect of SFS volume on SFM thickness and mechanical properties

| 3% SFS | weight | SFM thickness (mm) | | Time (h) | Tensile (MPa) | | Elongation at break (%) | |
|---|---|---|---|---|---|---|---|---|
| 5 mL | 0.15 g | 0.205 | ±0.018 | 12 | 8.39 | ±1.13 | 314.74 | ±49.24 |
| 7 mL | 0.21 g | 0.293 | ±0.049 | 16 | 9.82 | ±1.01 | 464.05 | ±21.41 |
| 10 mL | 0.30 g | 0.438 | ±0.013 | 24 | 11.80 | ±1.01 | 491.65 | ±18.31 |
| 15 mL | 0.45 g | 0.793 | ±0.065 | 36 | 5.69 | ±0.79 | 168.60 | ±42.39 |
| 18 mL | 0.54 g | 1.028 | ±0.041 | 48 | 2.39 | ±0.15 | 65.97 | ±6.31 |

(3) SFS Concentration

From the results in Table 2, the three SFMs prepared using three concentrations of 10 mg/mL (15.0 mL), 30 mg/mL (5.0 mL) and 45 mg/mL (3.4 mL) have similar weights. These SFMs also have similar thicknesses, and their tensile strength and elongation at break are very close in value. The results show that the SFS concentration has little effect on the SFM formation and its mechanical properties during the UND preparation.

TABLE 2

Effect of SFS concentration on the thickness and mechanical properties of SFMs

| SFS concentration | | SFM thickness (mm) | | Tensile (MPa) | | Elongation at break (%) | |
|---|---|---|---|---|---|---|---|
| 10 mg/mL | 15.0 mL | 0.184 | ±0.025 | 8.26 | ±1.54 | 324.47 | ±54.62 |
| 30 mg/mL | 5.0 mL | 0.181 | ±0.007 | 8.39 | ±1.13 | 314.74 | ±49.24 |
| 45 mg/mL | 3.4 mL | 0.191 | ±0.018 | 7.45 | ±0.57 | 347.00 | ±33.16 |

(4) Relative Humidity (RH)

At 25° C., samples of 5.0 mL of SFS (3.0%) for UND are placed under four different relative humidities of 35%, 50%, 85%, and 95% for 12-48 hours. The experimental results of the SFMs shown in Table 3 indicate that the relative humidity has an effect on the thickness, tensile strength, and elongation at break of the SFM formed.

TABLE 3

Effects of relative humidity on the thickness and mechanical properties of SFMs

| RH (%) | SFM thickness (mm) | | Tensile strength (MPa) | | Elongation at break (%) | |
|---|---|---|---|---|---|---|
| 35 | 0.205 | ±0.018 | 9.71 | ±0.73 | 427.84 | ±40.21 |
| 50 | 0.161 | ±0.014 | 9.60 | ±0.79 | 362.14 | ±50.90 |
| 85 | 0.178 | ±0.040 | 6.43 | ±0.50 | 349.75 | ±27.00 |
| 95 | 0.130 | ±0.043 | 7.03 | ±0.12 | 65.00 | ±9.76 |

(5) Temperature

At 50% RH and seven different temperatures (4° C., 15° C., 25° C., 35° C., 45° C., 50° C., 70° C.), seven SFMs are prepared with 5.0 mL of 3% SFS using UND for 12-48 hours. The experimental results are shown in Table 4. The temperature significantly affects the SFM thickness, mechanical properties, and swelling ratio. The higher the temperature is during preparation, the thinner the SFM formed by UND, the stronger the tensile strength, the smaller the elongation at break, and the lower the swelling rate. The thickness of the SFM formed by UND at 4° C. is the largest (0.236 mm), and is 7.91 MPa, the sample prepared at 70° C. has the highest tensile strength (15.35 MPa); meanwhile, the elongation at break is the largest for the sample prepared 25° C.

TABLE 4

Effect of temperature on the thickness, mechanical properties and swelling ratio of SFM

| Temperature (° C.) | SFM thickness (mm) | | Tensile strength (MPa) | | Elongation at break (%) | | Swelling ratio (%) | |
|---|---|---|---|---|---|---|---|---|
| 4  | 0.236 | ±0.015 | 7.91  | ±2.26 | 380.30 | ±42.30 | 47.6 | ±0.015 |
| 15 | 0.208 | ±0.011 | 6.79  | ±0.60 | 381.42 | ±14.47 | 48.2 | ±0.015 |
| 25 | 0.205 | ±0.008 | 8.39  | ±1.13 | 414.74 | ±49.24 | 54.5 | ±0.016 |
| 35 | 0.181 | ±0.005 | 9.95  | ±0.98 | 363.38 | ±34.55 | 48.6 | ±0.028 |
| 45 | 0.151 | ±0.018 | 14.36 | ±1.09 | 353.62 | ±17.28 | 42.3 | ±0.014 |
| 50 | 0.161 | ±0.023 | 15.27 | ±3.61 | 305.53 | ±17.28 | 39.8 | ±0.011 |
| 70 | 0.159 | ±0.005 | 15.35 | ±3.04 | 199.90 | ±36.74 | 35.4 | ±0.006 |

(6) Effect of Pore Size of Nanofiltration Film

In this example, five kinds of dialysis films with different molecular weight cut-off ranges are used as nanofiltration films for testing. 5.0 mL 3 w % SFS is pipetted into the molds, and the molds are placed at 25° C. and 35% RH with micro-fan ventilation and dehydrated via nanopores in one direction for 12-36 hours. The experimental results are shown in Table 5. The five dialysis films with different pore sizes form similar SFMs with thicknesses between 0.225 mm and 0.271 mm, and the swelling rates are between 56.79% and 63.89%. There are no significant differences between film pore sizes and SFM thickness. The results showed that the molecular weight cut-off from 0.1-1000 kDa of the dialysis membrane did not affect the formation of the SFM.

TABLE 5

Effect of pore size of nanofiltration film on SFM thickness and swelling rate

| Nanofiltration film pore size (molecular weight cut-off range) | SFM thickness (mm) | +SD | Swelling rate (%) | +SD |
|---|---|---|---|---|
| ~0.1 kDa | 0.238 | 0.067 | 60.27 | 5.36 |
| ~1 kDa | 0.246 | 0.025 | 63.89 | 4.87 |
| ~10 kDa | 0.271 | 0.036 | 56.79 | 6.54 |
| ~100 kDa | 0.225 | 0.022 | 60.81 | 7.35 |
| ~1000 kDa | 0.230 | 0.031 | 60.29 | 3.46 |

(7) SFM Thickness and Mechanical Properties

Table 6 compares the two types of SFMs prepared under the same experimental environment (25° C., 35% RH, and micro-fan ventilation). During the preparation, 35.0, 52.5, and 70.0 mL of 3 w % SFS are dehydrated unidirectionally through nanopores for 12 to 48 hours to prepare three UND-based SFMs on an area of 50 cm2 with different thicknesses. The casted SFM-E is prepared by blasting 35 mL 3 w % SFS in a PP box with an area of 50 cm2 and then immersed in 80% methanol in aqueous solution for 1-2 minutes to become SFM-EM rich in β-sheet structure. SFM-EM is used as a control sample. A tensile testing machine measures the mechanical properties according to the method of Example 3, the measurement is repeated 15 times, and the average value and standard deviation (±SD) are calculated from these values.

The experimental results show that the SFM formed by UND and the evaporated SFM-EM have large differences in membrane thickness and tensile properties (Table 6). The thicknesses of the SFMs are nearly proportional to the amount of SFS added; the thickness of the SFM prepared from 35 mL of 3% SFS is 0.19 mm, while the thickness of ordinary SFM-EM is 0.10 mm, and the former is 1.9 times that of the latter. This indicates that the internal structure of the UND-based SFM is much looser than that of the cast type SFM-EM. However, the tensile force of the UND-based SFM is 1.8 times stronger than that of the evaporative SFM-EM, reaching 7.26 N; with the increase of the thickness of the UND-based SFM, the tensile force also increases proportionally. Since the tensile strength is related to the SFM thickness, the three UND-based SFMs are similar to the evaporation (cast) membrane (SFM-EM, 13.60 MPa). The elongation at break properties of the SFMs are significantly different from that of the SFM-EM. The elongation at break of the evaporated SFM-EM is ~100%, while the elongation at break values of the three UND-based SFMs are 4-6 times higher than that of the SFM-EM.

TABLE 6

Comparison of SFM thickness and mechanical properties

| SFM sort | 3% SFS (mL) | Mass (g) | SFM thickness (mm) | ±SD | Tensile force (N) | ±SD | Tensile strength (MPa) | ±SD | Elongation rate (%) | ±SD |
|---|---|---|---|---|---|---|---|---|---|---|
| SFM-EM | 35.0 | 1.05 | 0.10 | 0.01 | 4.08 | 0.25 | 13.60 | 0.51 | 102.28 | 12.06 |
| SFM | 35.0 | 1.05 | 0.19 | 0.01 | 7.26 | 0.31 | 12.74 | 0.94 | 412.84 | 32.80 |
|  | 52.5 | 1.61 | 0.31 | 0.00 | 12.38 | 0.37 | 13.31 | 0.40 | 591.02 | 55.63 |
|  | 70.0 | 2.10 | 0.43 | 0.01 | 19.02 | 0.64 | 14.74 | 0.61 | 641.49 | 55.25 |

(8) Comparison of Stress-Strain Curves

Figure 2:
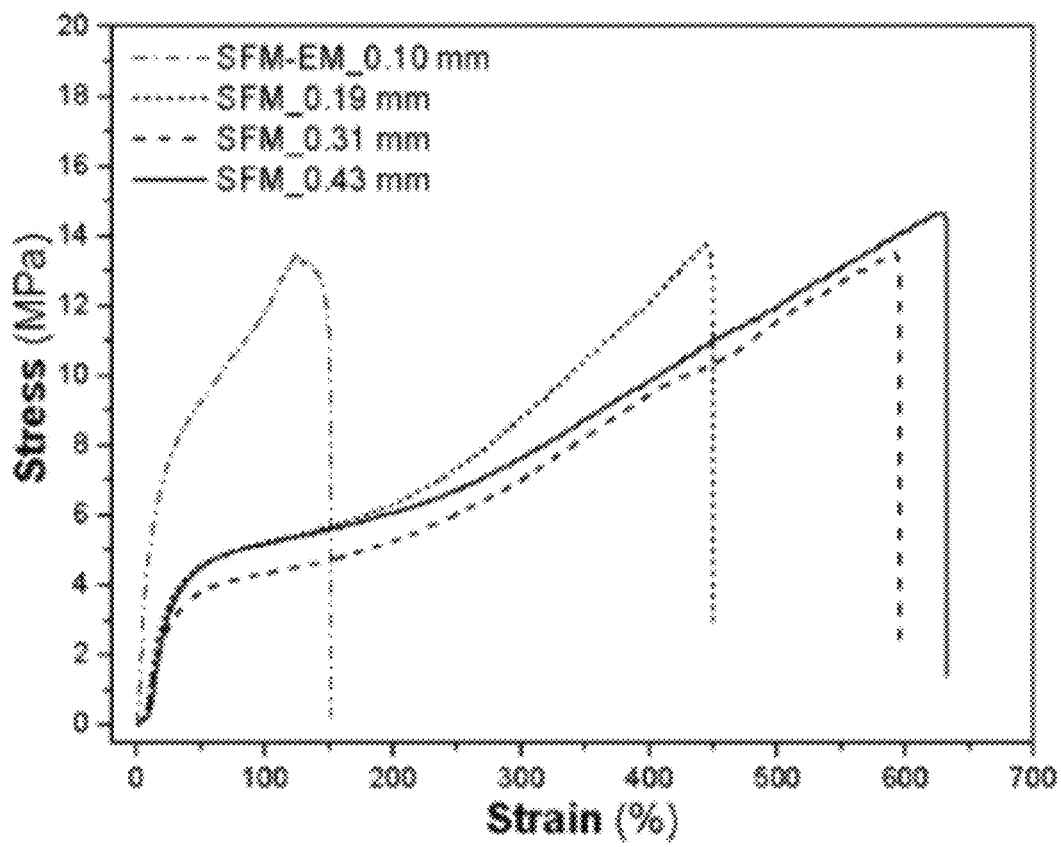
FIG. 2 presents the stress and strain curve diagram of SFM provided by the example of the present invention.

The thicknesses of SFMs prepared using UND with three amounts of 3% SFS (35.0, 52.5, and 70.0 mL) are 0.19, 0.31, and 0.43 mm, respectively (Table 6). The membrane area (50 cm²) and the amount of 3% SFS in the control sample (SFM-EM) is the same as that of the UND-based membranes prepared with the lowest concentration. FIG. 2 compares the stress and strain curves of the SFMs provided in the present example. After SFM-E is immersed in 80% methanol in aqueous solution for 1-2 minutes, the resulting SFM-EM is the evaporated type. The UND-based SFMs have three different thicknesses; FIG. 2 shows that the thickness of the evaporated film is only 0.10 mm, while the thickness of the nanopore-dehydrated SFMs with the same amount of silk fibroin and film area is as high as 0.19 mm, which is 1.9 times thicker. The elongation rate is 1.8 times higher than that of the evaporation film, the tensile strength of the two films is about 13.6 MPa, and the average elongation at break of the three UND-based SFMs is more than five times that of the film prepared by evaporation (SFM-EM).

Example 5

The present example describes the structural characteristics and characterization of an SFM prepared using UND.

(1) FTIR Spectroscopy

Figure 3:
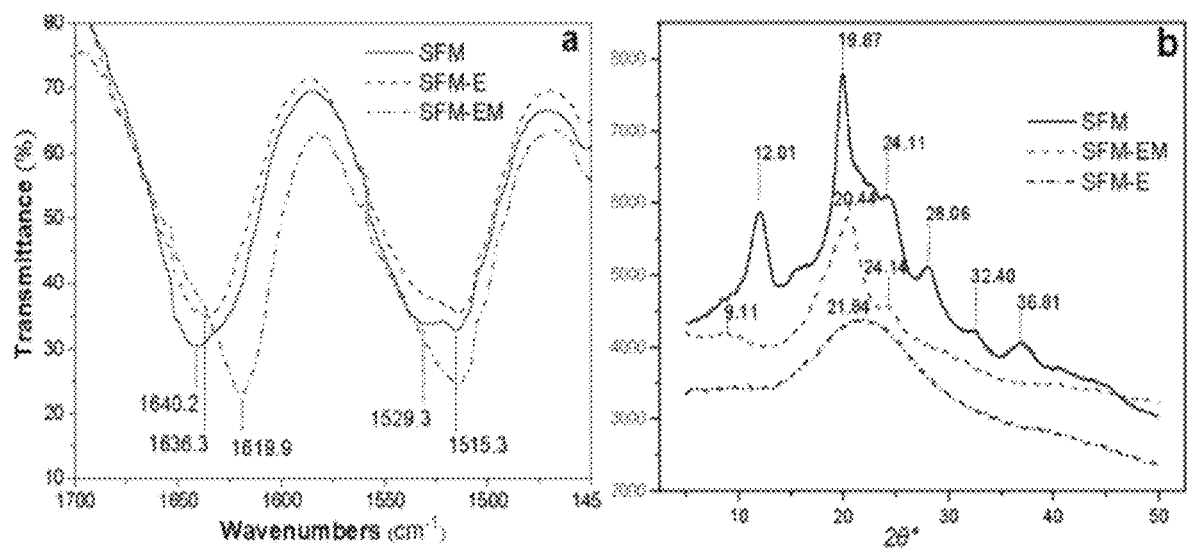
FIG. 3 shows the (a) Fourier Transform Infrared (FTIR) spectrum and (b) X-ray diffraction pattern of the SFM provided in the example of the present invention.

The typical FTIR spectrum of protein molecules contains two main absorption peaks, the C—O stretching vibration in the amide I band (1638 cm$^{-1}$) and the N—H vibration in the amide II band (1545 cm$^{-1}$). FIG. 3a shows the FTIR spectrum of the SFM provided by the present invention. In the figure, the SFM-E is immersed in methanol to become a water-insoluble SFM-EM; the SFM is prepared using UND. In FIG. 3, the amide I band of SFM-E shows a strong peak at 1636.3 cm$^{-1}$, corresponding mostly to the random coil structure. After being immersed in 80% methanol in aqueous solution for 1-2 minutes, the amide I band in SFM-EM moves to lower wavenumbers, and a very strong absorption peak appears at 1619.9 cm$^{-1}$, which indicates that the structure of the membrane has transformed into a second structure dominated by β-sheets. The UND-based SFM is distinct from the above-mentioned SFM-E, and a strong peak appears at 1640.2 cm$^{-1}$, indicating that the UND-based SFM structure has a type II β-turn, the so-called silk I structure. In the amide II region, the peaks of evaporated SFM-E and β-SFM-EM all appear at 1515.3 cm$^{-1}$, indicating that both β-sheet structures exist. However, the UND-based SFM differs significantly from the above two by having a strong shoulder at 1529.3 cm$^{-1}$, which is more significant than the shoulder present in the spectrum of SFM formed by the slow evaporation of water from small pores reported by Lu et al. (Acta Biomaterialia 2010, 6:1380-1387). Thus, the structural rearrangement of silk fibroin molecules caused by UND is somewhat different from the structural changes of silk fibroin reported above.

(2) X-Ray Diffraction Spectroscopy (XRD)

An experimental sample of SFM is prepared from 5.0 mL 3 w % SFS using UND for 24 hours at 25° C., 35% RH, and micro-fan ventilation. The other two control samples are water-soluble SFM-E, prepared by evaporation on a PP plate under the same conditions for 12 hours, and water-insoluble SFM-EM prepared by immersion in 80% methanol in aqueous solution for 1 to 2 minutes. FIG. 3b provides the XRD spectrum of the SFM from the present example of the present invention. This figure presents the spectra of the evaporated SFM-E, which is immersed in methanol to become a water-insoluble SFM-EM and the SFM prepared using UND. From the XRD spectrum in FIG. 3b, it can be observed that the SFM-E prepared by conventional evaporation has a single very broad peak near 21.84°, the typical amorphous structure of the soluble SFM. However, the diffraction peaks of the SFM-EM induced by methanol treatment appear at 9.11°, 20.44°, and 24.14°. The SFM-EM has a Silk II structure dominated by β-sheets. However, the diffraction peaks of the UND-based SFM in the present invention are completely different, appearing at 12.01°, 19.87°, 24.11°, 28.06°, 32.40° and 36.81°.

Example 6

The present example describes the enzymatic hydrolysis properties and biocompatibility of an SFM prepared using UND.

Figure 4:
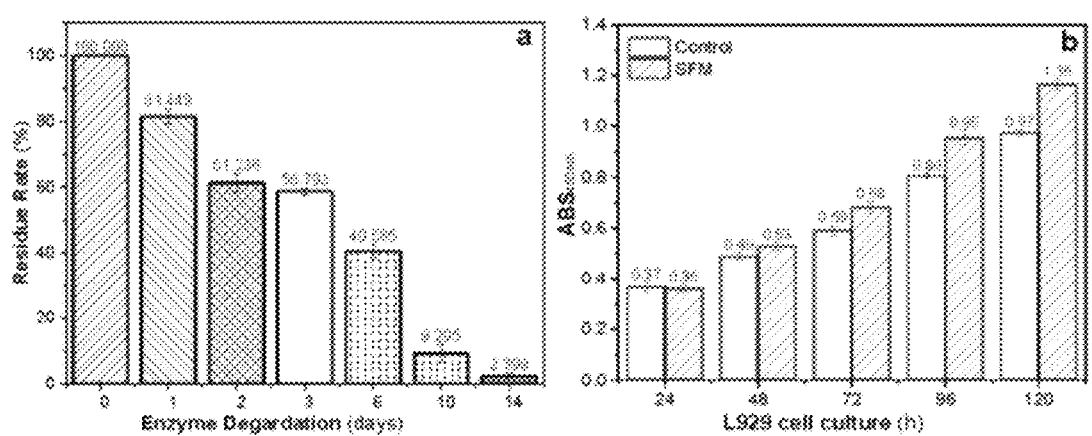
FIG. 4 gives the (a) in vitro neutral protease degradation and (b) cell culture diagram of SFM provided in the examples of the present invention.

The ultimate purpose of silk biomaterials is implantation in the human body to support or repair tissues or organs, and for this purpose, its biodegradation efficiency needs to be evaluated. FIG. 4a is a diagram of the in vitro neutral protease degradation of the SFM provided in the example of the present invention; in FIG. 4, the SFM prepared using UND can be degraded in neutral protease solution within 1 day. The degradation rate is about 20% and the weight loss rate increases with an increase in the number of degradation days. When the degradation reaches the fourteenth day, the residue weight is less than 3%. Thus, the water stability of this UND-based SFM is excellent. However, the unique characteristics of the secondary structure are easily degraded by neutral proteases, and the material prepared by the present invention is very suitable for biodegradable in vivo implants.

Figure 5:
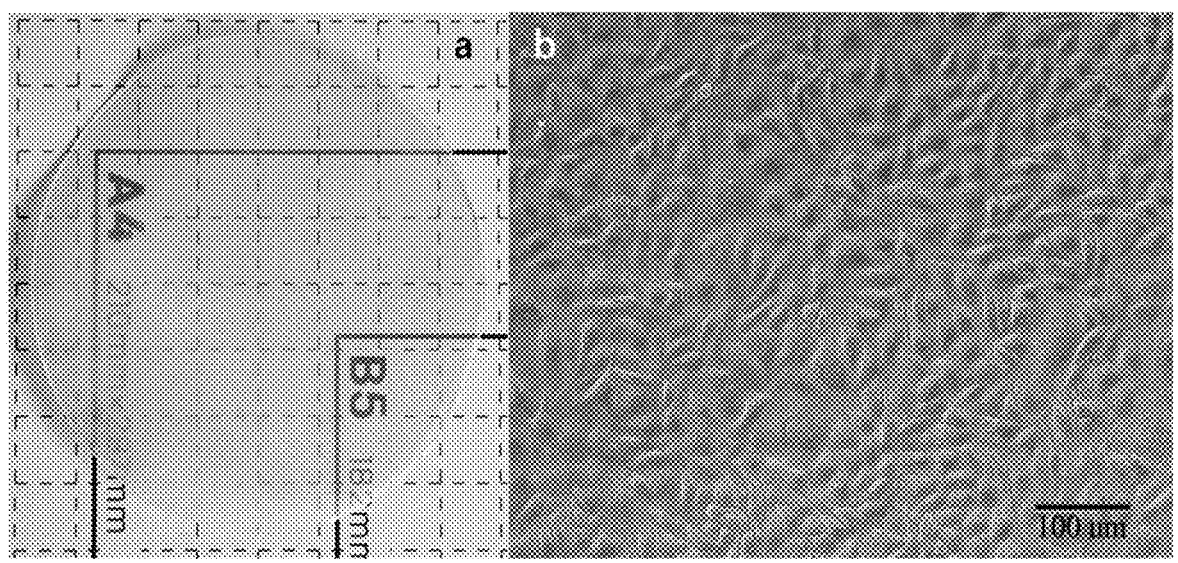
FIG. 5 is the growth state diagram of L929 cells on the fourth day of the SFM provided by the examples of the present invention.

A culturing experiment is carried out on the UND-based SFMs according to the method of L929 murine fibroblasts described in Example 3, and the CCK8 quantitative method is used to measure the cell viability of L929 on the SFM in ordinary culture dishes daily. The experimental results are shown in FIG. 4b, that is, the growth curve of L929 cells on the SFM provided by the example of the present invention. From this figure, the cells are cultured on the UND-based SFM. The L929 cells appear with adherent growth on the third day, and then the cell adhesion gradually increases. After 5 days of culturing, the cells continue to grow normally, almost cover the entire surface of the SFM, and present a typical fibroblast shape. The growth of these cells is almost the same as that of the control group grown in ordinary Petri dishes. FIGS. 5a and 5b show the UND-based SFM provided by the present invention and the growth state diagram of L929 cells cultured on the SFM on the fourth day, respectively.

Example 7

The present example describes the characteristics of a silk fibroin plasticized/cross-linked/composite membrane prepared using UND.

According to the UND method of Example 1 and Example 2 and FIG. 1, 5 mL of 3.0% SFS containing 5% glycerol, 25 μL polyethylene glycol diglycidyl ether (PEGDE) or 0.1 mg rhodamine 101 are added to a mold with a diameter of 30 mm and placed at 25° C. and 35% RH. At the same time, a fan is added under the mold to increase air flow. The multifunctional silk fibroin-glycerol plasticized membrane (SFM-G), silk fibroin-PEGDE cross-linked membrane (SFM-PEGDE), and silk fibroin-rhodamine 101-composite membrane (SFM-R101) with excellent mechanical properties are obtained. The SFM-G plasticized film is softer than the SFM without plasticizer, and the mechanical properties of the SFM-PEGDE cross-linked film are stronger than that of the SFM. Under sunlight, the SFM-R101 film is light red, the color of R101; the SFM-G and SFM-PEGDE films are milky-white and translucent, similar to SFM alone. The two films are light blue under ultraviolet light, the fluorescence color emitted by the silk fibroin protein. The SFM-R101 film fluoresces bright red, the color emitted by the R101 trapped in the SFM. The stress-strain curve of SFM-G is similar to that of unplasticized SFM, but the tensile strength is significantly enhanced (18.36 MPa), and the elongation at break (382%) is slightly lower. The mechanical properties of SFM-PEGDE are significantly better than those of un-crosslinked SFM. The stress-strain curve of SFM-R101 is similar to that of SFM alone, but the tensile strength (13.59 MPa) and elongation at break (380%) are slightly lower.

Example 8

The present example describes the preparation of a urease-immobilized SFM prepared using UND.

According to the UND method of Examples 1, 2, and 4 and FIG. 1, a dialysis film with a molecular weight cut-off of ~10 kDa is placed at the bottom of the mold. A sample of 5 mL of 3.0% SFS containing a certain urease unit is added to the mold through the sampling hole at the top and dehydrated via nanopores by air flowing at 25° C. and 35% RH for 10 to 16 hours. Immobilized urease in SFM (SFM-Urease) is obtained. The method for measuring urease activity is as follows: take 5 ml of urea solution (0.3 M) and heat it in a water bath at 37° C. for 5 minutes. Add a certain amount of urease or SFM-Urease (0.2 g) that has swelled in a water-urea solution, and continue to heat the mixed solution of urease and urea. The enzymatic reaction is carried out in a water bath shaker at 37° C. for 10 minutes at 110 rpm; after the reaction is complete, an appropriate amount of the reaction solution is diluted with double distilled water to 200 μL, and then 10 μL of 10% sodium potassium tartrate and 20 μL of Nessler's reagent are added in sequence and fully mixed. After standing for 15 minutes, the absorbance value is measured at 420 nm. Finally, the absorbance value is substituted into the ammonium concentration standard curve (calculated from 0, 0.1, 0.2, 0.3, 0.4, and 0.5 mL of 0.25 M $(NH_4)_2SO_4$ solution). The ammonium ion concentration is calculated from the standard curve, and the catalytic production of 1 µmol/minute of ammonium nitrogen is defined as an enzyme activity unit to calculate the activity of the immobilized enzyme.

Figure 6:
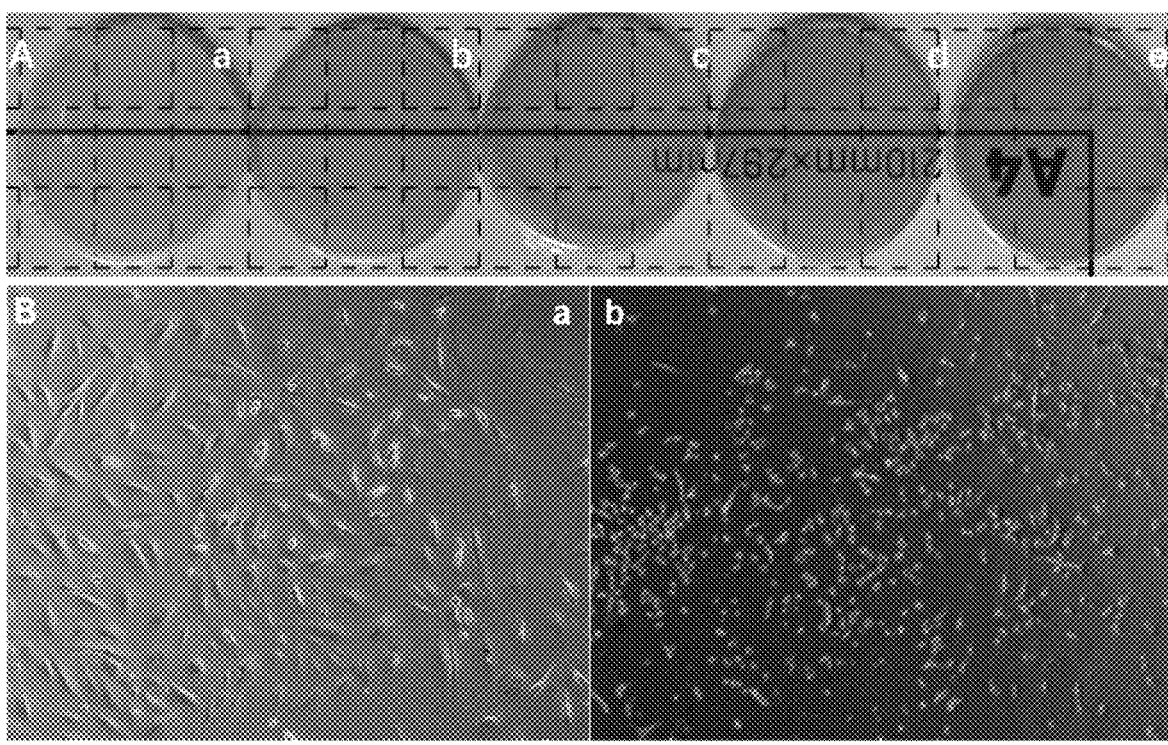
FIG. 6 is an image of the culture of A549 cells on the doxorubicin-released SFM provided by the examples of the present invention.

Table 7 shows the activity recovery rates of nine levels of urease immobilized in SFM as the measured values of free urease activity as 100%. The activity recovery of the immobilized enzyme (SFM-Urease) is calculated by the linear equation of the established standard curve of free urease concentration vs. absorbance value. The urease level immobilized in the SFMs gradually increases from 1.5 U to 25.0 U, and the activity recovery rate of the immobilized enzyme also changes. When the SFM/urease ratio reaches 1:4, that is, a 0.2 g SFM-Urease film contains 0.8 U of free urease, the recovery rate of the enzyme activity reaches ~75%.

thelial cell of human alveolar adenocarcinoma A549 is used as a test model, and an antitumor activity test of immobilized DOX in SFM is conducted in vitro, and the results are shown in FIG. 6B. The A549 cells in the control group are normally attached, grown, and proliferated on the SFM without DOX. FIG. 6Ba shows the cell state on the fourth day of culturing. Some dead A549 cells on the SFM-DOX membrane could be observed on the second day, and almost all the A549 cells died by the fourth day (FIG. 6Bb). This result indicates that the doxorubicin, which has a broad-spectrum anti-cancer effect, continues to inhibit tumor growth even after being made into a slow-releasing SFM-DOX film.

Example 10

The present example describes a conductive polypyrrole-modified SFM prepared using UND.

According to the UND method of Example 1, Example 2, and FIG. 1, the dialysis film with a molecular weight cut-off of ~10 kDa is selected for the bottom of the mold, 5 mL of

TABLE 7

The activities and recovery rates of the immobilized urease in a UND-based SFM

| Addition of free urease (U) | 0.3 | 0.4 | 0.5 | 0.6 | 0.7 | 0.8 | 1.0 | 2.0 | 5.0 |
|---|---|---|---|---|---|---|---|---|---|
| SFM/urease (g/U) | 1:1.5 | 1:2 | 1:2.5 | 1:3 | 1:3.5 | 1:4 | 1:5 | 1:10 | 1:25 |
| Activity of SFM-Urease (U) | 0.13 | 0.20 | 0.28 | 0.38 | 0.47 | 0.60 | 0.65 | 0.53 | 0.91 |
| Recovery rates (%) | 42.25 | 49.39 | 56.77 | 63.59 | 67.30 | 74.90 | 64.85 | 26.55 | 18.11 |
| Mean ± SD | 0.95 | 1.15 | 2.97 | 0.58 | 1.94 | 2.53 | 5.3 | 0.02 | 3.61 |

Example 9

The present example describes a doxorubicin-released SFM prepared using UND According to the UND method of Examples 1, 2, and 4, and FIG. 1, a dialysis film with a molecular weight cut-off of ~10 kDa is placed at the bottom of the mold. A sample of 5 mL of 3.0% SFS containing 0, 50, 100, 150, 200, and 250 µg of doxorubicin (DOX) is added through the sampling hole at the top of the mold. After the samples are unidirectionally dehydrated via the nanopores for 10-16 hours, the DOX-released SFM (SFM-DOX) is obtained on the bottom membrane of the mold.

The A549 cell culture method is to use a hole punch to make disks of SFM alone and SFM-DOX films, rinse them with PBS for 5 minutes, then soak them in 75% ethanol for 10 minutes, repeat the above steps three times, and irradiate the prepared disks with UV light for 30 minutes. These SFMs are then placed in a 12-well plate with F12 medium and incubated overnight. After rinsing these SFMs with PBS, sub-cultured A549 cells are added to the membrane in a 12-well plate, a serum containing F12 medium is added, and the samples are shaken well. The 12-well plate is placed in the incubator, and the cell status is observed daily.

FIG. 6A contains photographs of DOX-released SFMs at the five concentrations of DOX provided in the example of the present invention. In FIG. 6A, the subfigures a, b, c, d, and e are images of SFMs containing 0.2, 0.4, 0.6, 0.8, and 1.0 mg/g DOX, respectively. FIG. 6B is photographs of the fourth-day cultures of A549 cells on the SFM-DOX (0.6 mg/g) membrane provided in the example of the present invention. From FIG. 6A, the color of the SFMs deepens from pale pink to red with increasing DOX concentration. Moreover, the transparency of the SFM is not affected in any way after adding DOX. In this experiment, the basal epi- 3.0% SFS is placed in a UND mold (30 mm diameter) at 25° C. and 35% RH, and is unidirectionally dehydrated via nanopores for 10-16 hours, and the resulting SFM is removed from the mold. Next, the SFM is added to 10 mL of an aqueous solution containing 2% pyrrole (Py, dissolved by distilled water before use), 0.02 M citric acid, and 0.02 M sodium sulfosalicylate, followed by magnetic stirring for 2 hours. Next, 10 mL of 1.0 M $FeCl_3$ solution is added for in situ polymerization overnight at −20° C. After the reaction, the black SFM samples are washed thoroughly with water and ethanol alternately several times to remove the unreacted pyrrole monomers, thereby obtaining a polypyrrole-modified SFM (SFM-PPy) by in situ polymerization (FIG. 7b). FIGS. 7a and b are the pristine SFM and the conductive SFM-PPy provided by the present example, respectively. In the figure, the conductive silk fibroin film (SFM-PPy) with a resistance of 60Ω is prepared by in situ polymerization in a 4.5% pyrrole reaction solution.

Example 11

The present example describes a casein cross-linked hydrogel membrane prepared using UND.

According to the UND method described in Example 2 and FIG. 1, a dialysis film with a molecular weight cut-off of ~10 kDa is selected for the bottom of the mold. To prepare the membrane, 5 mL of 3% casein in aqueous solution containing 0.025 mL of PEGDE is poured into the mold (diameter 30 mm) through the sampling hole at the top of the mold. Next, the sampling hole is plugged with a rubber stopper (5). Then, the mold is placed horizontally on a mold rack at room temperature (25° C.) or relative humidity (35% RH). At the same time, a fan is added under the mold to increase the air flow and then allowed to dehydrate unidirectionally via the nanopores for 10-16 hours. The casein cross-linked hydrogel membrane (CA-PEGDE) is recovered from the nanoporous filter film of the mold. In addition, a control sample, which is an evaporated casein cross-linked film, is prepared by the cast method described in Example 2 (FIG. 7c).

Figure 7:
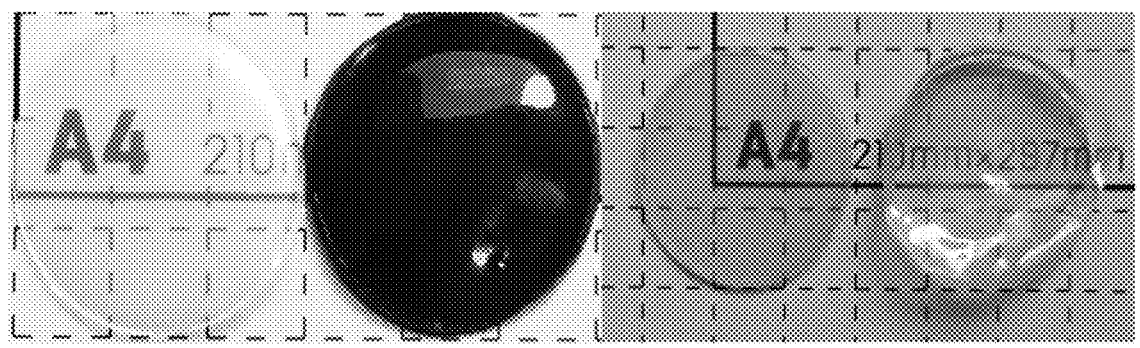
FIG. 7 is a comparison chart of the light transmission performance between the conductive silk fibroin and polypyrrole-modified membrane and the casein-PEGDE cross-linked membrane provided by the examples of the present invention.

FIG. 7 is a photograph of the CA-PEGDE films (c) produced by UND and (d) ordinary evaporation provided in the present example of the present invention. As shown in FIG. 7, the common evaporated casein-PEGDE film is uneven, wrinkled, thin (~0.15 mm), and non-uniform (FIG. 7d); while the CA-PEGDE film prepared by the UND method of the present invention (FIG. 7c) is flat, very transparent, elastic, and has a uniformly thick film (0.55 mm), which is more than 2-3 times thicker than that of the former.

Example 12

The present example describes a silk fibroin bioplastic membrane (SFBM) prepared using UND.

According to Example 2, Examples 5-10 and FIG. 1, various SFMs, including the composite, cross-linked, fluorescent, sustained-release, and conductive type, are immersed in water at 25° C. for at least 2 hours, and then the swelled SFMs are placed on the stretcher and stretched 3-5 times while in the wet state, and allowed to stand in the stretched state for about 10-20 minutes. The stretched SFM (SFM-5S) is milky-white and referred to as silk fibroin bioplastic membrane (SFBM). This kind of bioplastic film is similar in dry and wet states, like a synthetic polymer plastic, and is not only elastic but also mechanically tough, not easy to crack or break. The SFBM can then be processed by mechanical cutting or crushing into silk fibroin tablets, granules, or powders with various functions. This SFBM has good biocompatibility and is not easily degraded by proteases or digested by gastric juice in vivo or in vitro, and is suitable for medical tissue engineering material applications.

Figure 8:
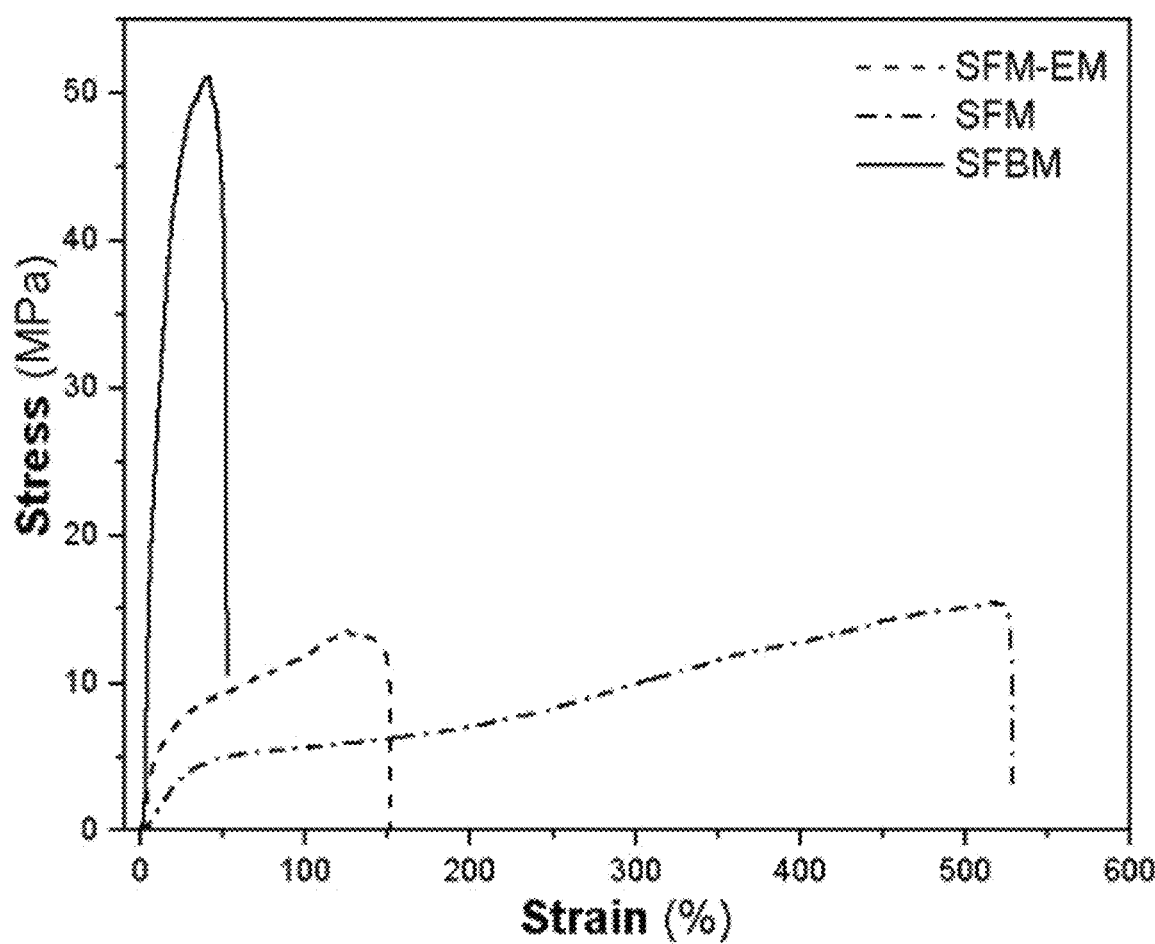
FIG. 8 shows the stress and strain curves of the silk fibroin bioplastic membrane (SFBM) provided by the examples of the present invention.

Referring to FIG. 8, the SFBM is obtained by stretching five times with a UND-based SFM provided in the example of the present invention. FIG. 8 shows the stress-strain curves of the SFM-EM formed by ordinary evaporation and then treated with methanol as a control film, the UND-based SFM, and the UND-based SFBM. The tensile strength of the UND-based SFM is similar to that of the evaporated SFM-EM, which is about 13.60 MPa. The elongation at break of the UND-based SFM is more than five times (without breaking) that of the SFM-EM. According to the above results, another SFBM is prepared by 5-fold stretching of the UND-based SFM in the present example. This SFBM is milky-white, hard to break, and in the dry state, hard like plastic, and its dry state properties before and after stretching are completely different. The SFBM is also wetted and then subjected to a tensile test. As shown in FIG. 8, its tensile strength reaches 51.05 MPa, 3.3 times that of the original UND-based SFM. The elongation at break corresponds to a substantial drop of 50%.

Example 13

The present example describes a PVAHM prepared using UND and its mechanical properties.

According to the UND method described in Example 1, Example 2, and FIG. 1, 35.0 mL of 10 w % PVA in aqueous solution is poured into the mold at 25.0° C. and 35% RH, and with a micro-fan to accelerate air flow. A PVAHM with an area of 50.0 cm2 is obtained after UND for 12-16 hours.

After removal from the mold, the PVAHM is cut into a rectangular strip of film, and the mechanical properties of the wetted film are measured according to the test method for mechanical properties given in Example 3. Table 8 shows that different thicknesses of PVAHM significantly affected its tensile properties. The thicker the hydrogel film, the stronger the tensile force, ranging from 1-50 N, the greater the elongation at break, ranging from 350% to 800%. Different volumes of PVA solution will form hydrogel films of different thicknesses. With the increased volume and thickness, the maximum load (Fmax) of PVAHMs increases gradually. The elongation at break (BE) is positively correlated with the volume of PVA used. Due to the limited accuracy of the measuring instrument, the PVA cannot be accurately measured when the amount of PVA is less than 2.5 mL and more than 12.5 mL. However, within the measurable range, the PVA hydrogel prepared by this method has a larger volume and thickness, so its mechanical properties are also greater.

TABLE 8

PVAHM thickness and mechanical properties

| PVA (mL) | thickness (mm) | Fmax (N) | ±SD | σ (MPa) | ±SD | BE (%) | ±SD |
|---|---|---|---|---|---|---|---|
| 2.5 | 0.18 | 1.16 | 0.25 | 0.43 | 0.07 | 358.99 | 31.56 |
| 5.0 | 0.49 | 12.78 | 1.67 | 2.95 | 0.37 | 392.36 | 9.06 |
| 7.5 | 0.71 | 14.81 | 1.87 | 5.15 | 0.14 | 477.06 | 25.22 |
| 10.0 | 0.95 | 35.25 | 6.40 | 5.13 | 0.92 | 650.45 | 96.22 |
| 12.5 | 1.19 | 48.35 | 3.36 | 4.47 | 0.08 | 794.20 | 50.14 |

Figure 9:
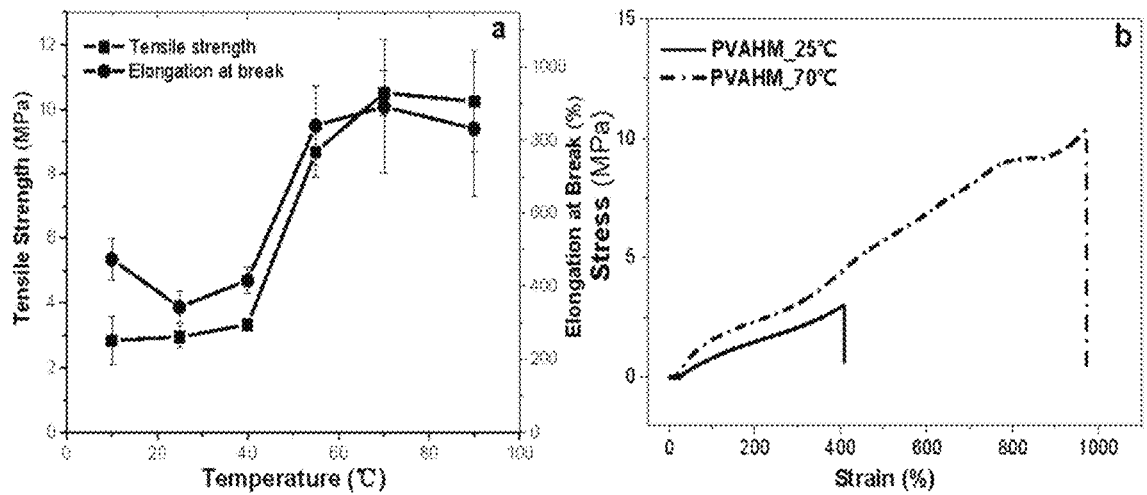
FIG. 9 gives the stress and strain curves of the effects of UND temperature on the mechanical properties of PVAHM provided by the present invention.

The time taken for the preparation of PVAHM at different temperatures differs, and the dehydration speed increases with increasing temperature. The higher the temperature, the shorter the time required to form the film. From the tensile results in FIG. 9a, rising temperatures can significantly increase the maximum load, elongation at break, and tensile strength of the PVAHM. At 25° C., the tensile strength of PVAHM is close to 3.0 MPa, and the elongation at break reaches 400%; when the temperature rises from 40° C. to 55° C., the tensile strength and elongation at break of PVAHM formed by oriented nanopore dehydration. When the formation temperature rises to 70° C., the two indexes reach the peak values of 10.5 MPa and 890%. Referring to FIG. 9a, the mechanical properties of the PVAHM provided by the present invention are affected by temperature change.

From FIG. 9b, the PVAHM formed by UND at 25° C. has good mechanical properties, the tensile strength and the elongation at break reach 2.95 MPa and 407%, respectively; At 70° C., the dehydration time is shortened significantly by a third, the tensile strength is greatly improved, increasing 3.6 times, and the elongation at break increases by 40%. Therefore, the mechanical properties of this hydrogel membrane can be adjusted by varying the temperature during preparation. FIG. 9b is the stress-strain curve of PVAHM formed by UND at 25° C. and 70° C. provided by the present invention.

Example 14

The present example describes a PVA-composite/cross-linked hydrogel membrane prepared using UND.
(1) Preparation of PVA-Composite/Cross-Linked Hydrogel Membranes According to the UND method described in Example 1, Example 2, and FIG. 1, 35.0 mL of 10% PVA in aqueous solution is mixed with casein (CA) or starch (DOS) in aqueous solution or the cross-linking agent MBA (N,N-methylene bispropylene amide) in a weight percent (w %) mixture, as shown in Table 9, 10 and 11, which is added to the 50.0 cm² mold, and the sampling hole (4) is blocked with a rubber stopper (5) to make the chamber airtight. At 25.0° C. and 35% RH, a fan is added to circulate the air, and after the mixed samples are dehydrated unidirectionally through nanopores for 12-16 hours, four kinds of hydrogel films (PVAHM, PVA-CA, PVA-DOS, and PVA-MBA) are obtained.

Table 9 shows the effect of casein incorporation on the mechanical properties of the PVA-CA composite hydrogel films. The greater the amount of casein incorporated, the greater the effect on the tensile force of the resulting composite hydrogel film. However, the elongation at break grows with increasing amounts of casein. The PVA-DOS composite hydrogel film is prepared by mixing PVA and DOS in different proportions, and Table 10 shows that its tensile force decreases significantly with an increasing proportion of DOS, while the elongation at break rises slightly. In addition, Table 11 shows that adding MBA to the PVA cross-linked hydrogel membrane affects its mechanical properties. The greater the amount of MBA added, the stronger the tensile force is, and the elongation at break also increases significantly, while the swelling ratio decreases slightly. The PVA-MBA containing 0.5% MBA has a tensile strength of 14.67 N, the elongation at break reaches about 460%.

TABLE 9

Effect of casein content on mechanical properties of PVA-CA hydrogel membranes

| PVA-CA (mL) | PVA-(%) CA | Fmax (N) | +SD | BE (%) | +SD |
|---|---|---|---|---|---|
| 5.0:0 | 100:0 | 13.20 | 0.36 | 335.19 | 44.93 |
| 4.5:0.5 | 90:10 | 12.41 | 0.65 | 263.50 | 21.35 |
| 4.0:1.0 | 80:20 | 5.52 | 0.17 | 281.66 | 29.34 |
| 3.5:1.5 | 70:30 | 1.11 | 0.28 | 274.55 | 41.07 |
| 3.0:2.0 | 60:40 | 0.89 | 0.34 | 348.13 | 75.42 |
| 2.5:2.5 | 50:50 | 0.46 | 0.11 | 416.25 | 30.77 |

TABLE 10

Effect of starch content on mechanical properties of PVA-DOS hydrogel membranes

| PVA-DOS (mL) | PVA-DOS(%) | Fmax (N) | ±SD | BE (%) | ±SD | Swell rate (%) |
|---|---|---|---|---|---|---|
| 5.0:0 | 100:0 | 13.20 | 2.50 | 392.36 | 54.03 | 257.73 |
| 4.5:0.5 | 90:10 | 11.41 | 1.00 | 437.64 | 19.04 | 317.12 |
| 4.0:1.0 | 80:20 | 9.74 | 1.35 | 403.72 | 35.53 | 303.04 |
| 3.5:1.5 | 70:30 | 7.12 | 1.21 | 421.21 | 43.61 | 335.71 |
| 3.0:2.0 | 60:40 | 8.11 | 1.33 | 475.61 | 32.41 | 308.92 |
| 2.5:2.5 | 50:50 | 3.85 | 0.39 | 469.90 | 49.34 | 402.18 |

TABLE 11

Effect of MBA content on mechanical properties of PVA-MBA hydrogel membranes

| PVA-MBA (%) | Fmax (N) | +SD | BE (%) | +SD |
|---|---|---|---|---|
| 0 | 13.78 | 0.67 | 392.36 | 9.06 |
| 0.1 | 13.57 | 1.61 | 466.69 | 29.3 |
| 0.2 | 16.19 | 0.92 | 482.41 | 24.07 |
| 0.5 | 14.67 | 1.58 | 462.23 | 33.72 |
| 1.0 | 13.48 | 1.08 | 440.99 | 28.65 |
| 1.5 | 16.64 | 4.7 | 512.15 | 84.39 |
| 2.0 | 16.67 | 4.61 | 512.16 | 69.56 |

(2) Mechanical Properties and Swelling Ratio of PVA-Composite/Crosslinked Hydrogel Membranes Table 12 shows the film dimensions, swelling ratios, and mechanical properties before and after the swelling of PVAHM, PVA-10% CA, PVA-10% DOS, and PVA-0.2% MBA. From the results in the table, the changes before and after the swelling of the various hydrogels are very large. The four kinds of films are relatively soft when freshly removed from the 80-mm diameter mold and are not completely dry. After a period of storage or drying in an oven at 100° C. for 1 hour, a completely dry PVAHM/composite/cross-linked hydrogel membrane can be obtained. At this time, these dry PVA films are very hard. When immersed in water and allowed to swell at 25° C. for 24 hours, the diameters of the PVAHM, PVA-10% CA, PVA-10% DOS, and PVA-0.2% MBA membranes all increased from 80 mm to 104, 106, 105, and 103 mm, respectively. These swelling rates increase significantly. However, the transparency, water stability, and mechanical properties of these hydrogel films are not affected.

TABLE 12

Size, weight and tensile properties of PVA composite/cross-linked/hydrogel membranes before and after swelling

| PVA/composite/ hydrogel membranes | Dry weight before swelling | | Size & weight after swelling | | Swelling rate | Tensile strength ($\sigma$) | | Elongation at break (EB) | |
|---|---|---|---|---|---|---|---|---|---|
| | W (g) | ±SD (g) | $\phi \times \delta$ (mm) | W(g) | (%) | MPa | ±SD | (%) | ±SD |
| PVAHM | 3.359 | 0.050 | 103 × 1.16 | 10.901 | 257.5% | 5.01 | 1.02 | 425.01 | 82.94 |
| PVA-10% CA | 3.171 | 0.043 | 108 × 0.97 | 10.100 | 318.6% | 4.51 | 0.42 | 490.81 | 23.05 |
| PVA-10% DOS | 3.033 | 0.013 | 105 × 0.96 | 9.147 | 301.6% | 4.15 | 1.19 | 476.82 | 40.21 |
| PVA-0.2% MBA | 3.297 | 0.049 | 102 × 1.13 | 11.072 | 335.9% | 5.17 | 0.9 | 432.86 | 33.53 |

Note:
The diameter ($\phi$) and thickness ($\delta$) of all PVA hydrogel membranes in Table are 80 mm and 0.55 mm, respectively.

FIG. 9b shows the stress-strain curves of the PVAHM, PVA-10% CA, PVA-10% DOS, and PVA-0.2% MBA membranes provided by the present invention. Compared with the pristine PVAHM (FIG. 10a), the PVA-composite hydrogel membranes formed by incorporating 10% casein or starch have better mechanical properties. Except for a slight increase in the elongation at break, there is no significant change in tensile strength compared to the PVA hydrogels. The addition of the cross-linking agent MBA also did not cause major changes.

Figure 10:
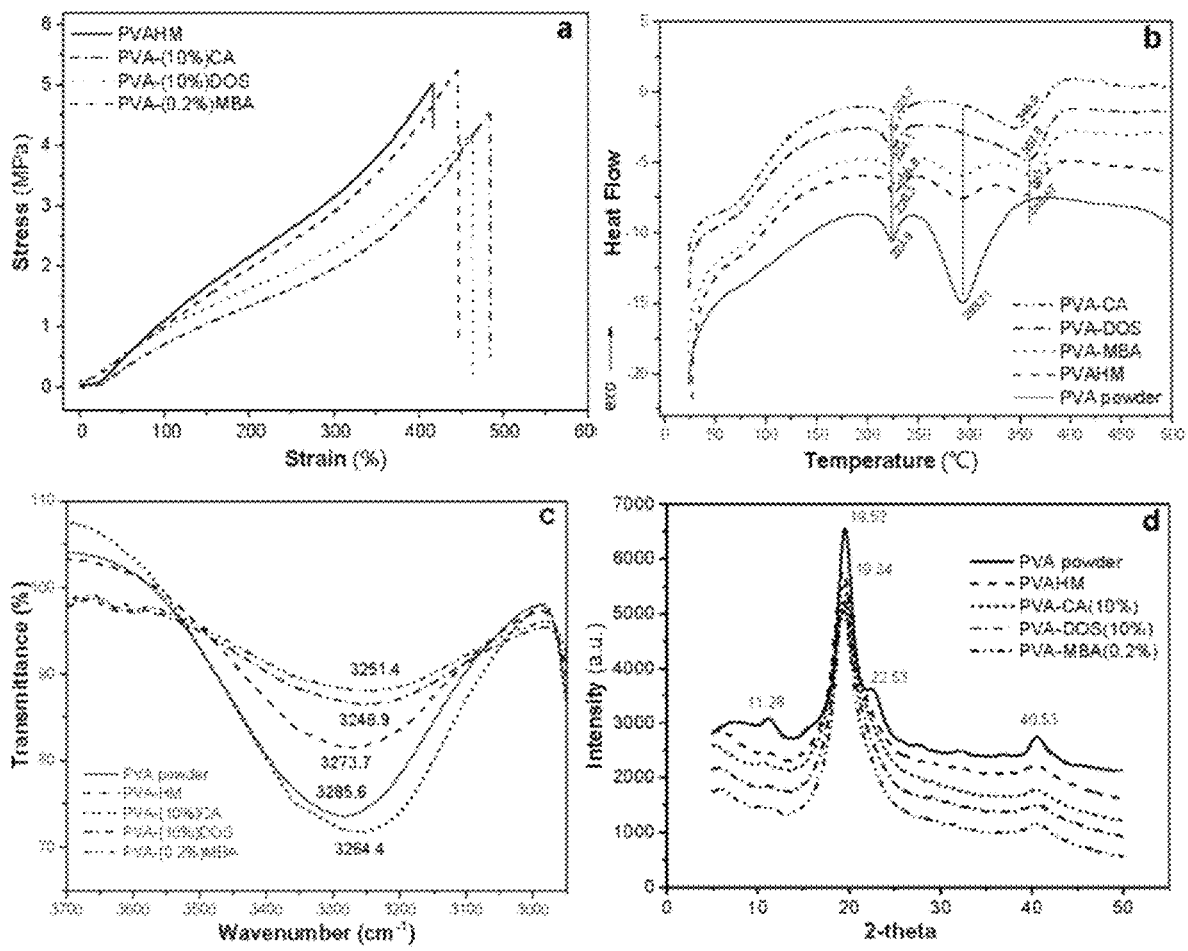
FIG. 10 presents the (a) stress-strain curves, (b) DSC curves, (c) FTIR spectra, and (d) X-ray diffraction patterns of the PVAHM and composite/cross-linked hydrogel membranes provided in the examples of the present invention.

(3) Thermal Properties, FTIR Spectroscopy, and XRD of PVA-Composite Hydrogel Membranes FIG. 10b shows the thermal analysis (DSC curves) of the four kinds of membrane, PVAHM, PVA-10% CA, PVA-10% DOS, and PVA-0.2% MBA, provided by the present invention and commercially available PVA powder. From FIG. 10b, the DSC curve of PVA powder has two melting peaks at 223.9 and 293.7° C., and the latter melting peak is stronger. This data might indicate strong hydrogen bonds within the PVA chains or between the chains in the powder. When the UND causes the molecular rearrangement of the PVA chains, more or stronger hydrogen bonds between the intra-chain or inter-chain hydroxyl groups appear. Unlike the four types of hydrogel membranes, the composite/cross-linked hydrogels membranes show a third melting peak. The melting peak of the hydrogels prepared by blending with CA and DOS increased to 345.9° C. and 357.6° C., respectively. The pristine PVAHM is almost the same as the PVA-MBA hydrogel membrane with a small amount of the cross-linking agent, except for the second weaker melting peak near 290° C., which is higher at 355.5° C. and 357.7° C., respectively.

FIG. 10c shows the FTIR spectra of the PVAHM, PVA-10% CA, PVA-10% DOS, and PVA-0.2% MBA membranes provided by the present invention. The FTIR spectrum of the commercial PVA powder sample has a broad absorption peak near 3285.6 cm$^{-1}$, which is the 0-H stretching bond. The 0-H stretching vibration peak of the PVAHM formed by UND is enhanced, and the peak shifts to the lower wavenumber at 3273.7 cm$^{-1}$, indicating that the binding ability of the hydrogen bonds is significantly enhanced. When the spectra of the composite hydrogels incorporating 10% casein and starch shift to lower wavenumbers, it indicates that the binding force of the hydrogen bonds is significantly enhanced.

FIG. 10d shows the XRD spectra of the four PVA hydrogel films. The commercial PVA powder sample has diffraction peaks at 2θ of 11.28°, 19.52°, 22.53° and 40.53°. The strongest diffraction peak is at 19.52°. When the PVA in aqueous solution is unidirectionally dehydrated through the nanopores, whether it is a hydrogel film with other proteins, polysaccharides, or cross-linking agents, or pristine without any added substances, intrachain or interchain molecular rearrangement occurs in the PVA hydrogel film formed. That is, more or stronger hydrogen bonds appear between intrachain or interchain hydroxyl groups, causing two small diffraction peaks at 2θ of 11.28° and 22.53° to almost disappear. The strong diffraction peak at 19.52° does not change significantly, but shifts slightly to 19.34°. These results fully demonstrate that the UND causes the rearrangement of molecules within or between the chains of PVA molecules, and the crystal structure changes significantly. FIG. 10c shows the XRD patterns of the PVAHM, PVA-10% CA, PVA-10% DOS, and PVA-0.2% MBA membranes provided by the present invention.

(4) SEM Observations of PVAHM/Composite/Cross-Linked Hydrogel Membranes

Figure 11:
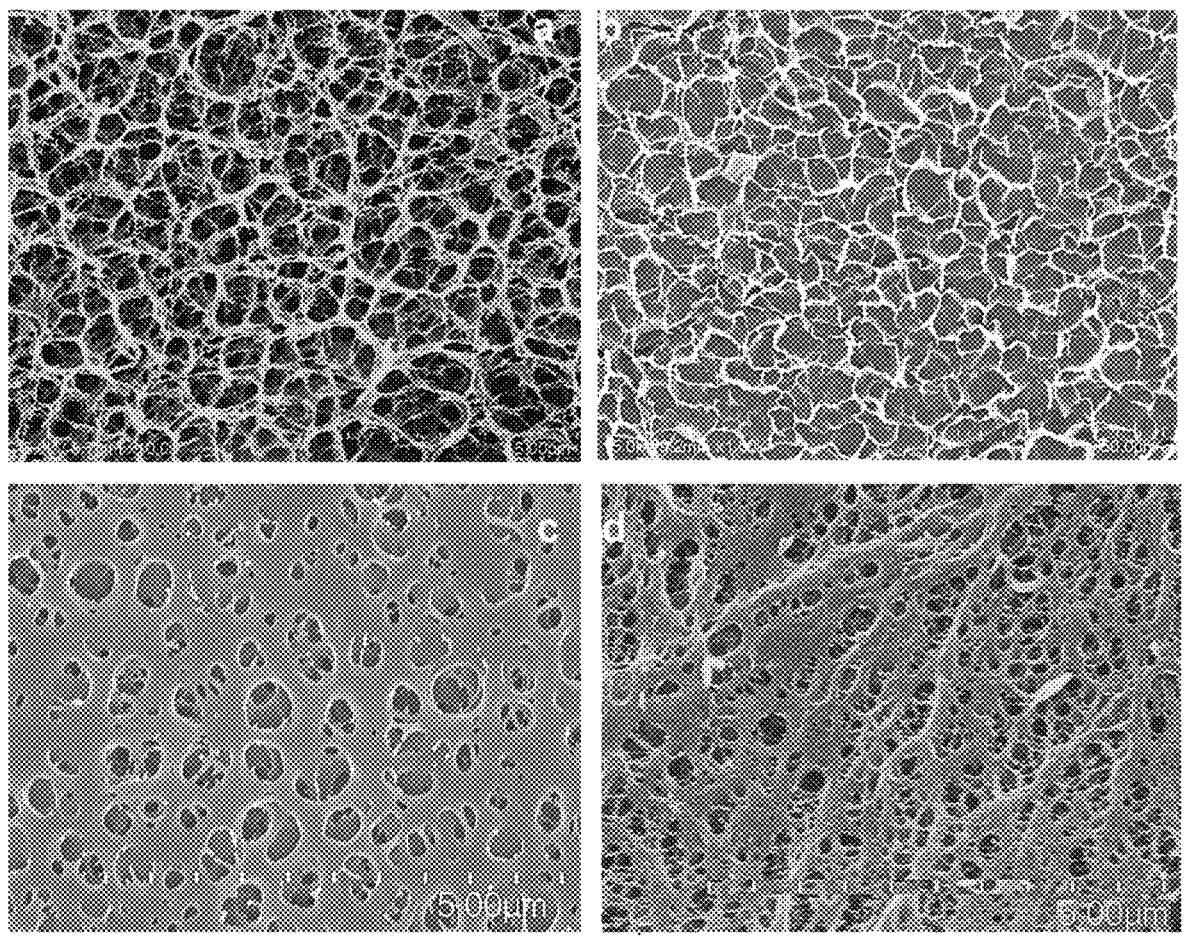
FIG. 11 is SEM images of cross-sections of the PVAHM and composite/cross-linked membranes provided in the examples of the present invention.

FIG. 11 shows the SEM images of the cross sections of the four hydrogel films, (a) PVAHM, (b) PVA-10% CA, (c) PVA-10% DOS, and (d) PVA-0.2% MBA, provided by the present invention. The microstructure of pure PVAHM can be observed in FIG. 11, showing a typical sponge-like porous web structure. The mesh distribution is uniform, and the pore size is between 0.5 and 1.5 After adding 10% casein (CA), the network pore size becomes 5-10 times larger. When 10% starch (DOS) is added, the pores that form on the surface of the membrane are very scarce, the pore size decreases, and the penetration of the pores inside the membrane is poor. Most pores are discrete spongy pores that appear to be foamed. The PVA cross-linked film with 0.2% MBA also has a network structure, and its pore size is much smaller than that of the pure PVAHM, and the hydrogel network is denser.

(5) Biocompatibility of PVAHM/Composite/Cross-Linked Hydrogel Membranes

Figure 12:
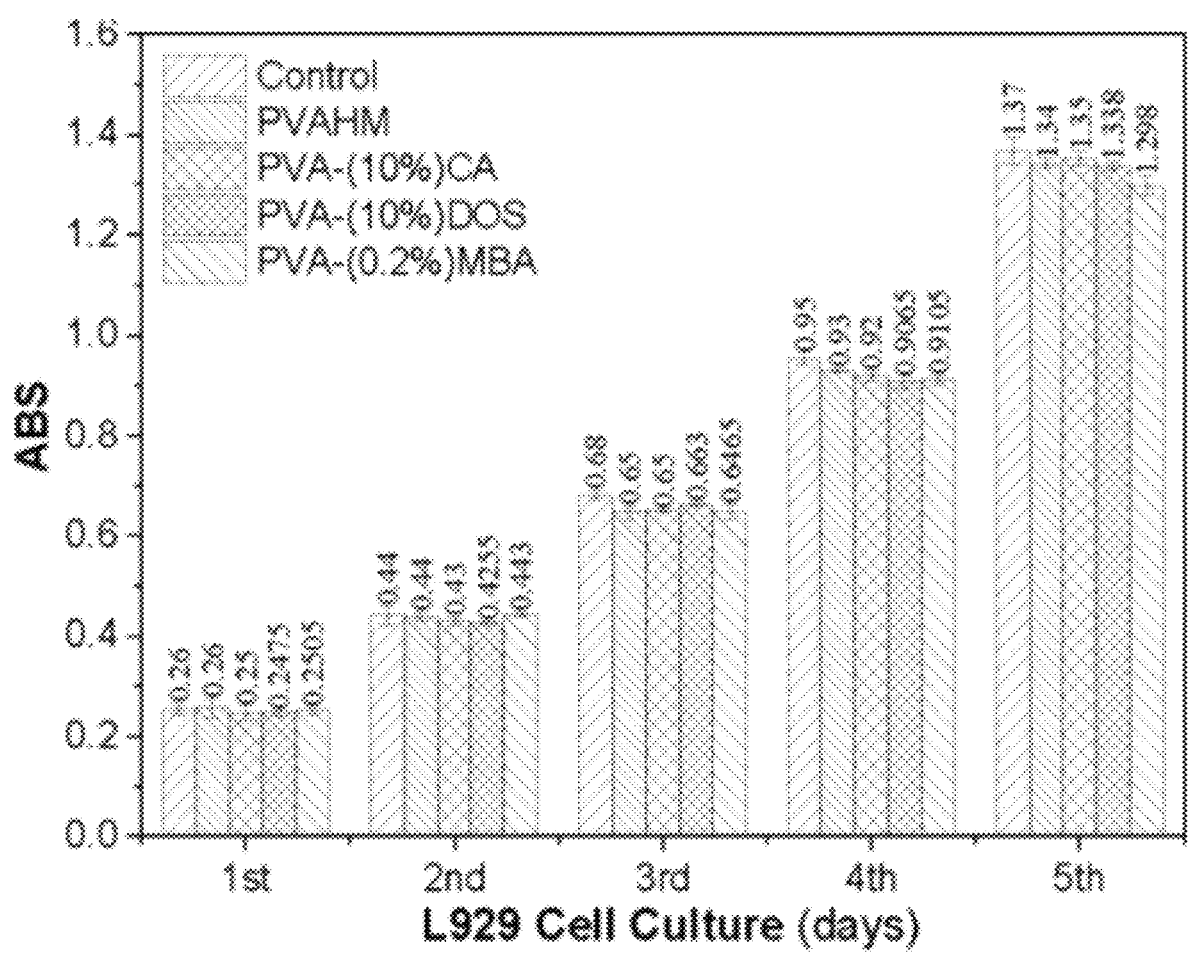
FIG. 12 is the process diagram of L929 cell cultures on the PVAHM and composite/cross-linked membranes provided by the present invention.
Figure 13:
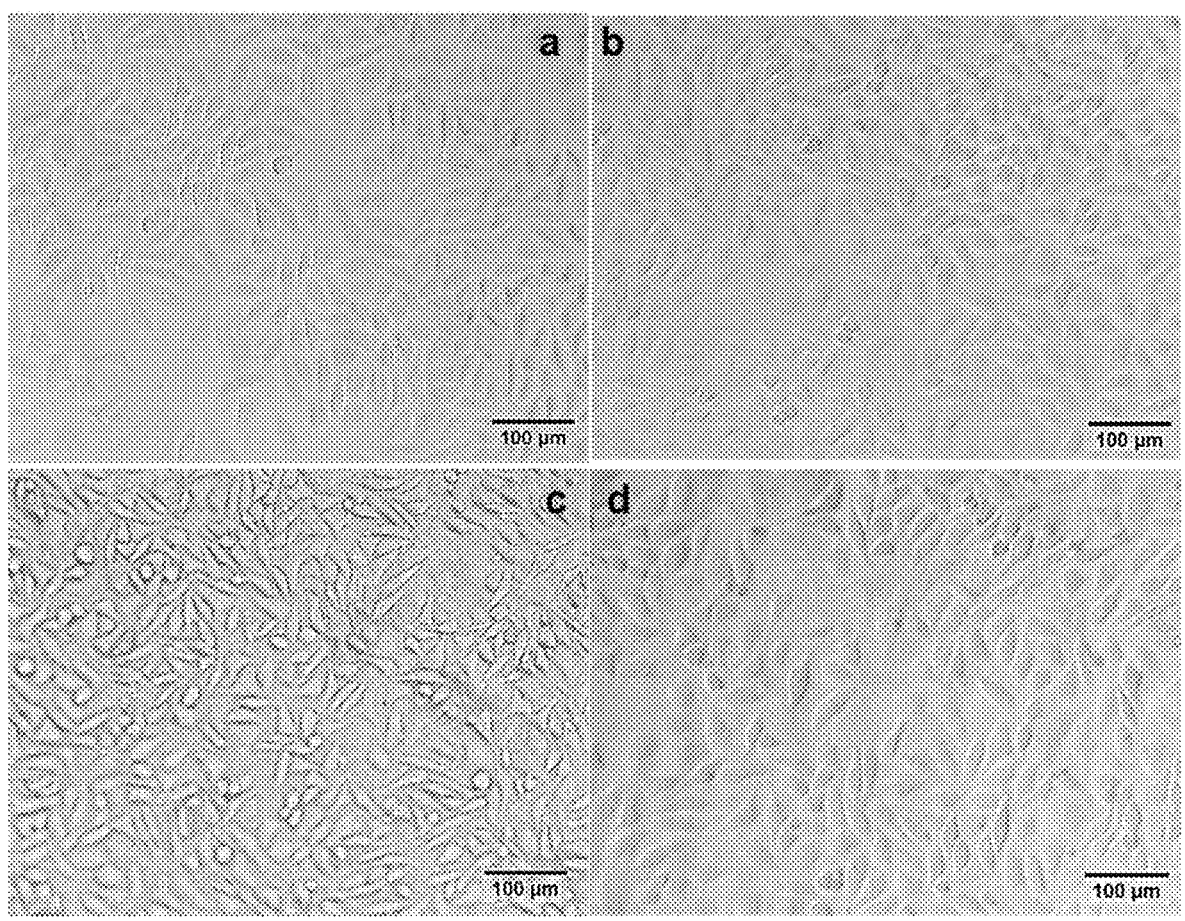
FIG. 13 is the growth state diagram of L929 cells on the fourth day of culture on the PVAHM provided by the present invention.

FIG. 12 is the change block diagram of the absorbance value measured daily over 1 to 5 days for L929 cells on four kinds of hydrogel membranes provided by the present invention. FIG. 12 truly reflects the proliferation and growth of L929 cells on these membranes. The L929 cells cultured on the pristine PVAHM are similar to the control group, with spindle-shaped cells and visible nucleoplasm. The PVA-10% CA membrane, containing 10% casein, is slightly milky-white with slightly poor light transmittance, which affected the use of the light microscope for imaging, but the growth density of L929 cells is similar on the fourth day. The light transmittance of PVA-10% DOS is better than that of the PVA-10% CA film, and the cell growth state and density are almost the same as those of the control group. The cell growth rate, density, and state of the PVA-0.2% MBA cross-linked membrane are similar to those of the PVA-CA membrane. FIG. 13 shows the growth states of L929 cells on the fourth day of culturing on the PVAHM (a), PVA-CA (b), PVA-DOS (c) and PVA-MBA composite/cross-linking hydrogel membranes provided by the present invention.

Example 15

The present example provides an *Escherichia coli*-immobilized PVAHM (PVA-EC) prepared using UND and its proliferation stability.

According to the UND method described in Example 1, Example 2, and FIG. 1, a dialysis membrane with a molecular weight cut-off of ~10 kDa is used in the bottom of the mold. A sample of 10% PVA in aqueous solution is mixed with *Escherichia coli* (*E. coli*, EC) solution in $1 \times 10^2$-$1 \times 10^4$ in different proportions, then 5.0 mL of the mixture is poured into the mold, and the mold is placed on a horizontal mold stand. Under the conditions of a sterile environment, 25° C. and 35% RH, the UND is carried out in air circulated by a micro-fan. After about 5 to 16 hours, the PVA-EC solution in the mold has been dehydrated to form an *E. coli*-entrapped PVAHM, and the mold is immersed in sterile water to remove the filter membrane. A water-insoluble, soft, elastic, and transparent PVA-EC hydrogel membrane is obtained.

Figure 14:
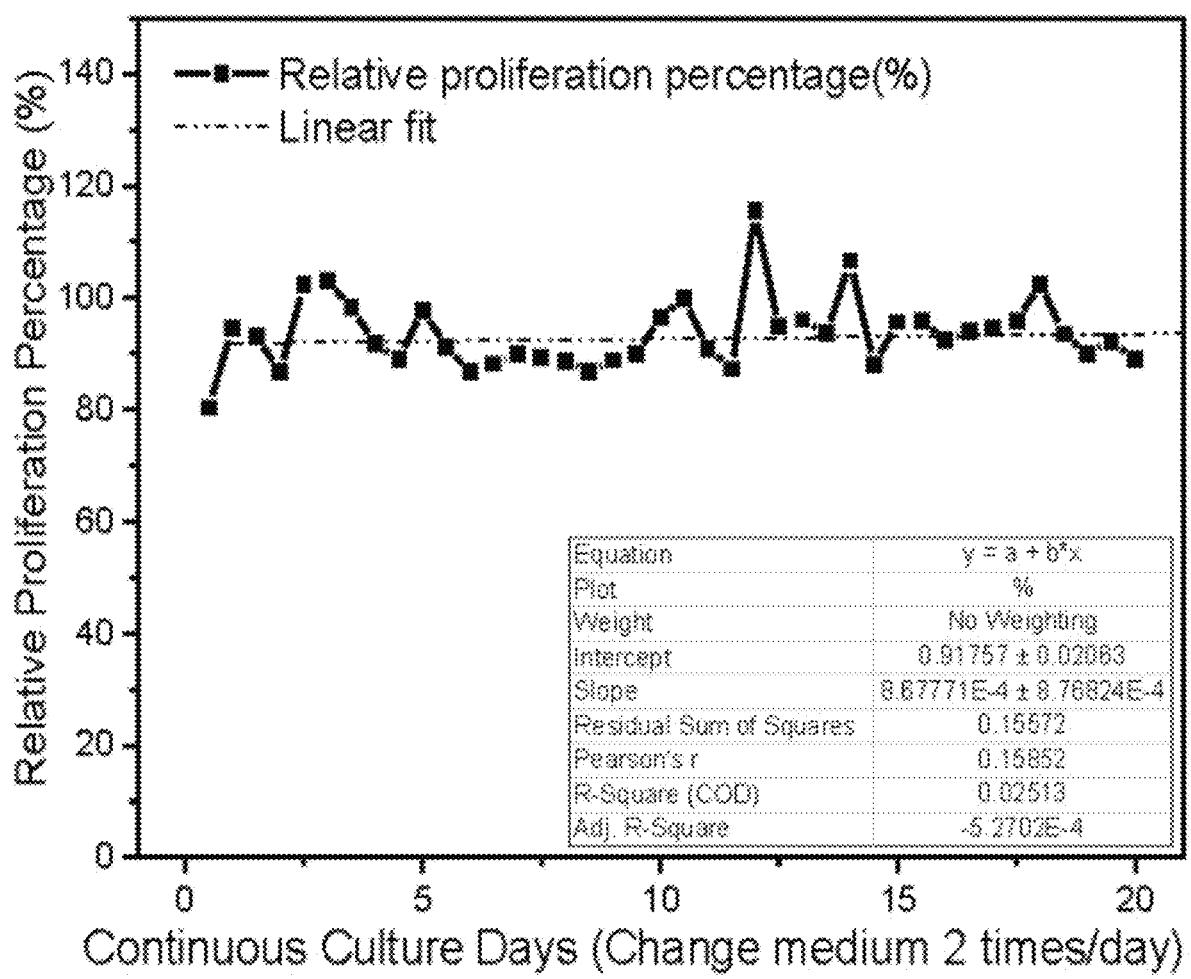
FIG. 14 shows the proliferation stability curve of *Escherichia coli*-immobilized PVAHM provided by the examples of the present invention.

In order to investigate whether the immobilization of *E. coli* in PVAHM affects microbial survival and proliferation, a 12-well culture plate is used to carry out a PVA-EC repeated culture experiment. The culture medium is replaced every 12 hours, and the absorbance of the culture medium at 600 nm is measured. Twenty days of continuous culture and detection are conducted in LB medium at 37° C., the absorbance value of non-immobilized free *E. coli* is 100%, and the proliferation rate of immobilized *E. coli* is calculated 40 times in 20 days. The relative percentage of 40 measurements is used as the ordinate, and the time sequence is used as the abscissa; these experimental results are shown in FIG. 14. After 40 repetitions of the medium exchange for consecutive 20 days, the linear fit of the proliferation absorbance value forms an almost horizontal straight line, and the relative proliferation rate is about 90%. This result shows that the PVA hydrogel membrane can not only effectively immobilize *E. coli* but also hardly affects its activity and proliferation rate. Therefore, this *E. coli*-immobilized PVA hydrogel membrane (PVA-EC) can be applied in various products, such as bacterial reactors, bacterial fuel cells, and biosensors. FIG. 14 shows the stability of the immobilized *E. coli* in the PVAHM provided by the present invention for 20 days and 40 repeated proliferations.

What we claim is:

1. A preparation method for a unidirectional nanopore dehydration-based functional polymer membrane or hydrogel membrane, comprising following steps: adding an aqueous polymer solution or a polymer mixture solution into a mold through a sampling hole on a top of a container, the mold being a container with a nanopore filter film as a bottom, sealing the sampling hole with a sealing cover, and dehydrating water molecules in the solution in one direction downward through nanopores of the filter film to obtain a polymer membrane or hydrogel membrane on an upper surface of the nanopore filter film, the aqueous polymer solution comprising an aqueous solution of a natural polymer or an artificial synthetic polymer or a mixed aqueous polymer solution containing polymers of more than 50 kDa formed by physical mixing or chemical cross-linking, and a concentration of the polymer being 1%-20% by mass percentage; and the mixture comprising proteins, polysaccharides, enzymes, cross-linking agents, plasticizers, drugs, pigments, growth factors, and/or microorganisms, and a concentration of the mixture being 0.1%-20% by mass percentage; and the natural polymer comprising one of regenerated liquid silk fibroins of domestic silkworm silk, spider silk, tussah silk, castor silk or wild silk, and the artificial synthetic polymer comprising polyvinyl alcohol.

2. A unidirectional nanopore dehydration-based functional polymer membrane or hydrogel membrane obtained by a preparation method for the unidirectional nanopore dehydration-based functional polymer membrane or hydrogel membrane comprising following steps:

adding an aqueous polymer solution or a polymer mixture solution into a mold through a sampling hole on a top of a container, the mold being a container with a nanopore filter film as a bottom, sealing the sampling hole with a sealing cover, and dehydrating water molecules in the solution in one direction downward through nanopores of the filter film to obtain a polymer membrane or hydrogel membrane on an upper surface of the nanopore filter film, the aqueous polymer solution comprising an aqueous solution of a natural polymer or an artificial synthetic polymer or a mixed aqueous polymer solution containing polymers of more than 50 kDa formed by physical mixing or chemical cross-linking, and a concentration of the polymer being 1%-20% by mass percentage; and the mixture comprising proteins, polysaccharides, enzymes, cross-linking agents, plasticizers, drugs, pigments, growth factors, and/or microorganisms, and a concentration of the mixture being 0.1%-20% by mass percentage; and the natural polymer comprising one of regenerated liquid silk fibroins of domestic silkworm silk, spider silk, tussah silk, castor silk or wild silk, and the artificial synthetic polymer comprising polyvinyl alcohol.

3. A preparation method for a unidirectional nanopore dehydration-based conductive polymer membrane or hydrogel membrane, comprising following steps: adding an aqueous polymer solution or a polymer mixture solution into a mold through a sampling hole on a top of a container, the mold being a container with a nanopore filter film as a bottom, sealing the sampling hole with a sealing cover, dehydrating water molecules in the solution in one direction downward through the nanopore filter film to obtain a polymer membrane or hydrogel membrane on an upper surface of the nanopore filter film, and performing an in-situ polymerization reaction on the obtained polymer membrane or hydrogel membrane with pyrrole in an aqueous solution to obtain a polypyrrole-modified conductive polymer membrane or hydrogel membrane, the polymer comprising one of regenerated liquid silk fibroins of natural polymer domestic silkworm silk, spider silk, tussah silk, castor silk or wild silk, or an artificial synthetic polymer polyvinyl alcohol.

4. A unidirectional nanopore dehydration-based conductive polymer membrane or hydrogel membrane obtained by a preparation method according to claim 3.

* * * * *